(12) United States Patent
Kobayashi

(10) Patent No.: US 10,203,350 B2
(45) Date of Patent: Feb. 12, 2019

(54) MEASUREMENT INSTRUMENT, MEASUREMENT METHOD, MEASUREMENT SYSTEM, AND PROGRAM

(71) Applicant: Seiko Epson Corporation, Tokyo (JP)

(72) Inventor: Yoshihiro Kobayashi, Komagane (JP)

(73) Assignee: Seiko Epson Corporation (JP)

( * ) Notice: Subject to any disclaimer, the term of this patent is extended or adjusted under 35 U.S.C. 154(b) by 135 days.

(21) Appl. No.: 15/272,775

(22) Filed: Sep. 22, 2016

(65) Prior Publication Data

US 2017/0097277 A1    Apr. 6, 2017

(30) Foreign Application Priority Data

Oct. 2, 2015  (JP) .................................. 2015-196614
Oct. 2, 2015  (JP) .................................. 2015-196615

(51) Int. Cl.
*G01P 13/00*    (2006.01)
*G01P 3/66*    (2006.01)

(52) U.S. Cl.
CPC ............... *G01P 13/00* (2013.01); *G01P 3/66* (2013.01)

(58) Field of Classification Search
CPC .. G06K 9/00791; G06K 9/00335; G06K 9/52; G01G 19/035; G01G 23/01; G01M 5/0008; G01P 15/00
USPC ....................................................... 348/148
See application file for complete search history.

(56) References Cited

U.S. PATENT DOCUMENTS

| | | | |
|---|---|---|---|
| 6,556,927 B1 | 4/2003 | Latta | |
| 9,267,862 B1 | 2/2016 | Kavars et al. | |
| 9,772,237 B1 * | 9/2017 | Bednarz | G01L 1/22 |
| 2012/0173171 A1 * | 7/2012 | Bajwa | G01H 11/06 |
| | | | 702/56 |

FOREIGN PATENT DOCUMENTS

| | | | |
|---|---|---|---|
| JP | 62-088098 A | 4/1987 | |
| JP | 2002-523767 A | 7/2002 | |
| JP | 2005-030786 A | 2/2005 | |
| JP | 4996498 B2 | 8/2012 | |
| JP | 2013-205164 A | 10/2013 | |
| WO | WO 2014089591 A1 * | 6/2014 | G01G 19/024 |

* cited by examiner

*Primary Examiner* — William C Vaughn, Jr.
*Assistant Examiner* — Jae N Noh
(74) *Attorney, Agent, or Firm* — Harness, Dickey & Pierce, P.L.C.

(57) ABSTRACT

An acquisition unit acquires the width-direction acceleration and the vertical-direction acceleration of a surface of a structure on which a moving object moves from an acceleration sensor provided in the structure on which the moving object moves. A displacement computation unit computes the vertical-direction displacement of the structure on the basis of the vertical-direction acceleration. A correlation determination unit determines the correlation between the width-direction acceleration and the vertical-direction displacement. A movement detection unit detects the movement of the moving object on the structure on the basis of the correlation.

10 Claims, 14 Drawing Sheets

MEASUREMENT INSTRUMENT, MEASUREMENT METHOD, MEASUREMENT SYSTEM, AND PROGRAM

BACKGROUND

1. Technical Field

The present invention relates to a measurement instrument, a measurement method, a measurement system, and a program.

2. Related Art

JP-A-2005-30786 discloses a measurement method of the wheel axis loads and weights of vehicles passing through bridges in which, in measurement units of the weights of vehicles passing through bridges, the running speeds of passing vehicles are detected by installing multiple sensors for speed detection along running paths, the wheel axis locations and the number of wheel axes of passing vehicles are detected by installing sensors for wheel axis detection in running paths, passing vehicles are recognized using running speeds and wheel axis locations, the deformation amounts of bridges are measured multiple times within set measurement durations for the wheel axes of at least the passing vehicles that have been recognized by installing measurement units of deformation amounts in the bridges, and the weights of the passing vehicles are computed on the basis of vehicle recognition data and the measurement data of the deformation amounts for wheel axes.

However, in JP-A-2005-30786, multiple sensors for speed detection are installed along running paths on bridges at predetermined intervals, and sensors for wheel axis detection are installed. Therefore, in JP-A-2005-30786, a number of kinds of sensors are used, and thus there is a problem in that high costs are required and great efforts are taken for installation of sensors and the like.

SUMMARY

An advantage of some aspects of the invention is to detect the movement of moving objects on structures using small-size and simple system constitutions and reduce costs or save efforts for installation of sensors.

A first aspect of the invention is directed to a measurement instrument including: an acquisition unit that acquires width-direction acceleration and vertical-direction acceleration of a surface of a structure on which a moving object moves from an acceleration sensor provided in the structure on which the moving object moves; a displacement computation unit that computes vertical-direction displacement of the structure on the basis of the vertical-direction acceleration; a correlation determination unit that determines a correlation between the width-direction acceleration and the vertical-direction displacement; and a movement detection unit that detects movement of the moving object on the structure on the basis of the correlation. According to the first aspect, it is possible to reduce costs for detecting the movement of moving objects on structures or save efforts for installation of sensors.

The acceleration sensor may be provided in an end portion of the structure which is parallel to a regulation direction of a moving direction regulation unit for the moving object which is provided in the structure and in a central portion of the end portion in the regulation direction. With this configuration, the acceleration sensor is capable of clearly detecting width-direction acceleration and vertical-direction acceleration.

A filter unit that suppresses intrinsic resonance frequency components of the structure which are included in the width-direction acceleration and the vertical-direction acceleration may be further provided. With this configuration, the measurement instrument is capable of appropriately detecting the movement of moving objects on structures.

An analysis unit that analyzes movement of the moving object on the structure according to the detection results of the motion of the moving object on the structure may be further provided. With this configuration, it is possible to analyze the motion of moving objects when the moving objects move on structures.

The analysis unit may analyze movement of the moving object on the structure on the basis of at least one of the width-direction acceleration and the vertical-direction displacement in a case in which motion of the moving object on the structure is detected. With this configuration, the measurement instrument is capable of analyzing the motion of moving objects from width-direction acceleration or vertical-direction displacement.

An acceleration waveform acquisition unit that acquires and stores characteristic information of a waveform of the width-direction acceleration in a case in which movement of the moving object on the structure is detected may be further provided. With this configuration, it is possible to reduce the storage capacities of storage devices.

A displacement waveform acquisition unit that acquires and stores characteristic information of a waveform of the vertical-direction displacement in a case in which movement of the moving object on the structure is detected may be further provided. With this configuration, it is possible to reduce the storage capacities of storage devices.

An envelope curve computation unit that computes an envelope curve of the vertical-direction acceleration and a vibration detection unit that detects vibrations of the structure on the basis of the envelope curve may be further provided. With this configuration, the correlation determination unit is capable of determining the correlation between width-direction acceleration and vertical-direction displacement when vibrations of structures are detected.

The correlation determination unit may determine the correlation in a case in which vibrations of the structure are detected. With this configuration, the correlation determination unit is capable of reducing loads of determination processes of correlations.

An output unit that outputs detection results of movement of the moving object may be further provided. With this configuration, users are able to learn the detection results of the movement of moving objects.

The structure may be a bridge. With this configuration, it is possible to reduce costs for detecting the movement of moving objects on bridges or save efforts for installation of sensors.

A second aspect of the invention is directed to a measurement method including: acquiring width-direction acceleration and vertical-direction acceleration of a surface of a structure on which a moving object moves from an acceleration sensor provided in the structure on which the moving object moves; computing vertical-direction displacement of the structure on the basis of the vertical-direction acceleration; determining a correlation between the width-direction acceleration and the vertical-direction displacement; and detecting movement of the moving object on the structure on the basis of the correlation. According to the second aspect, it is possible to reduce costs for detecting the movement of moving objects on structures or save efforts for installation of sensors.

A third aspect of the invention is directed to a measurement system including: an acceleration sensor which is provided in a structure on which a moving object moves and outputs width-direction acceleration and vertical-direction acceleration of a surface of the structure on which the moving object moves; and a measurement instrument including an acquisition unit that acquires the width-direction acceleration and the vertical-direction acceleration, a displacement computation unit that computes vertical-direction displacement of the structure on the basis of the vertical-direction acceleration; a correlation determination unit that determines a correlation between the width-direction acceleration and the vertical-direction displacement, and a movement detection unit that detects movement of the moving object on the structure on the basis of the correlation. According to the third aspect, it is possible to reduce costs for detecting the movement of moving objects on structures or save efforts for installation of sensors.

A fourth aspect of the invention is directed to a program causing a computer to execute acquiring width-direction acceleration and vertical-direction acceleration of a surface of a structure on which a moving object moves from an acceleration sensor provided in the structure on which the moving object moves, computing vertical-direction displacement of the structure on the basis of the vertical-direction acceleration, determining a correlation between the width-direction acceleration and the vertical-direction displacement, and detecting movement of the moving object on the structure on the basis of the correlation. According to the fourth aspect, it is possible to reduce costs for detecting the movement of moving objects on structures or save efforts for installation of sensors.

A fifth aspect of the invention is directed to a measurement instrument including: an acquisition unit that acquires width-direction acceleration and vertical-direction acceleration of a surface of a structure on which a moving object moves from an acceleration sensor provided in the structure on which the moving object moves; a correlation determination unit that determines a correlation between the width-direction acceleration and the vertical-direction acceleration; and a movement detection unit that detects movement of the moving object on the structure on the basis of the correlation. According to the fifth aspect, it is possible to reduce costs for detecting the movement of moving objects on structures or save efforts for installation of sensors.

A sixth aspect of the invention is directed to a measurement instrument including: an acquisition unit that acquires vertical-direction acceleration of a surface of a structure on which a moving object moves from an acceleration sensor provided in the structure on which the moving object moves; an envelope curve computation unit that computes an envelope curve of the vertical-direction acceleration; and a vibration detection unit that detects vibrations of the structure on the basis of the envelope curve. According to the sixth aspect, it is possible to reduce costs for detecting the movement of moving objects on structures or save efforts for installation of sensors.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention will be described with reference to the accompanying drawings.

First Embodiment

Figure 1:
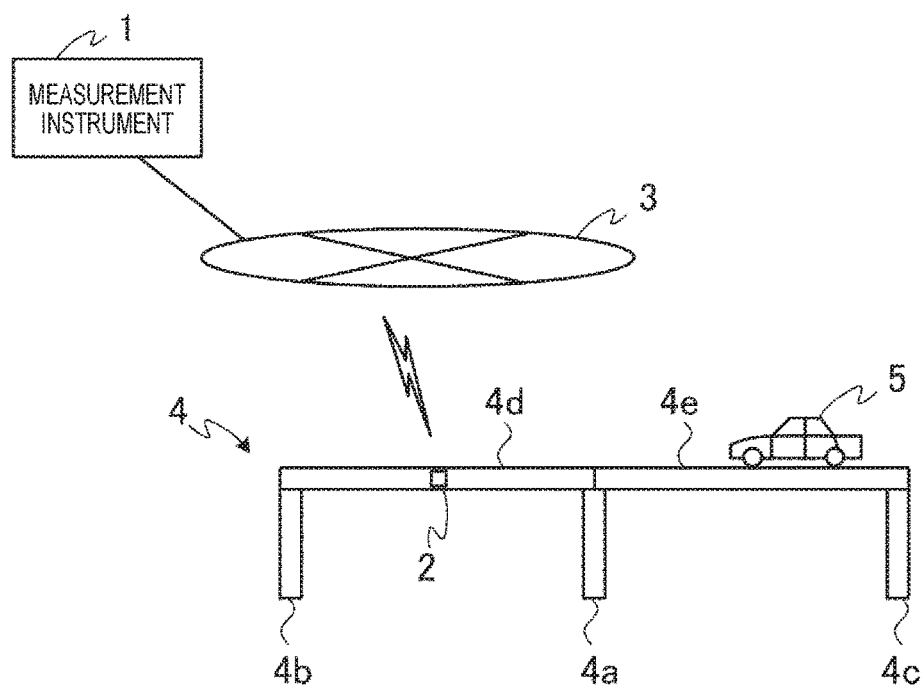
FIG. 1 is a view illustrating a constitutional example of a measurement system according to a first embodiment.

FIG. 1 is a view illustrating a constitutional example of a measurement system according to a first embodiment. As illustrated in FIG. 1, the measurement system has a measurement instrument 1 and an acceleration sensor 2. In addition, FIG. 1 illustrates a bridge 4.

The bridge 4 has a bridge pier 4a located in the central portion (including substantial central portions) of the bridge 4, two bridge abutments 4b and 4c located at both ends, a floor slab 4d extending from the bridge abutment 4b to the bridge pier 4a, and a floor slab 4e extending from the bridge abutment 4c to the bridge pier 4a. The bridge pier 4a and the bridge abutments 4b and 4c are respectively fixed onto basements (not illustrated) constructed on the ground.

The acceleration sensor 2 is preferably provided on the floor slab 4d of the bridge 4 in a case in which the subject structure is the bridge 4. Here, the floor slab 4d refers to a portion constituting a surface on which a vehicle 5 moves. The acceleration sensor 2 is installed, for example, on a side surface of the floor slab 4d. The acceleration sensor 2 measures acceleration generated by the deformation of the floor slab 4d which is caused by the passing (corresponding to movement according to the invention) of the vehicle 5 (corresponding to a moving object according to the invention) and outputs acceleration data thereof. The measurement instrument 1 and the acceleration sensor 2 are connected to each other through a communication network 3 so as to be capable of communicating with each other, and the acceleration sensor 2 sends the acceleration data to the measurement instrument 1 through the communication network 3. The acceleration sensor 2 includes an inertia sensor that outputs acceleration and angular speeds. Hereinafter, in some cases, acceleration data that are output from the acceleration sensor 2 will be expressed simply as acceleration.

The acceleration sensor 2 has, for example, a wireless communication interface or is connected to a wireless communication interface so as to be connected to the communication network 3 through the wireless communication interface.

The measurement instrument 1 receives the acceleration sent from the acceleration sensor 2. The measurement instrument 1 detects the passing of the vehicle 5 on the floor slab 4d on the basis of the acceleration sent from the acceleration sensor 2. That is, the measurement instrument 1 detects whether or not the vehicle 5 passes through on the floor slab 4d. Hereinafter, the passing of the vehicle 5 on the floor slab 4d will be referred to as an "event".

When an event is detected, the measurement instrument 1 analyzes the motion of the vehicle 5 that has passed through the floor slab 4d. For example, the measurement instrument 1 analyzes the passing duration, speeds, traffic lanes along which the vehicle runs (locations), weight, and the like of the vehicle 5 that has passed through the floor slab 4d.

As described above, the measurement instrument 1 detects events on the basis of acceleration obtained from the acceleration sensor 2. Therefore, the measurement instrument 1 does not need to use a variety of sensors in order to detect events and is capable of reducing costs. In addition, the measurement instrument 1 is capable of detecting events using at least one acceleration sensor 2 and saves efforts for the installation of sensors on the floor slab 4d.

Figure 2:
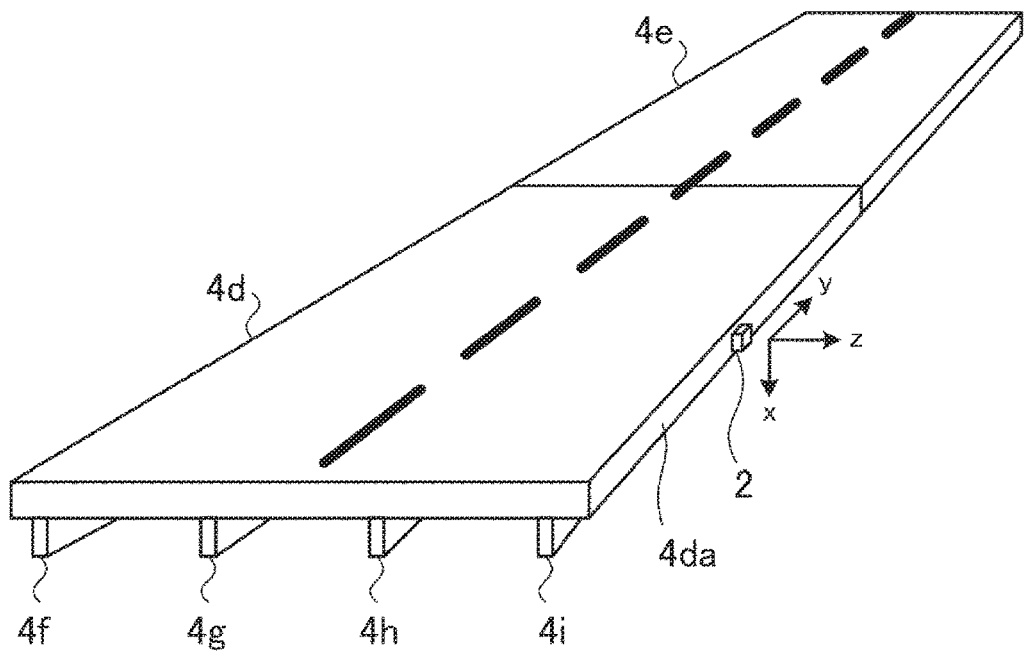
FIG. 2 is a view illustrating an example of an installation method of an acceleration sensor.

FIG. 2 is a view illustrating an example of an installation method of the acceleration sensor 2. FIG. 2 illustrates a perspective view of the floor slabs 4d and 4e illustrated in FIG. 1.

FIG. 2 illustrates main beams 4f to 4i which are not illustrated in FIG. 1. The main beams 4f to 4i are overlaid on the upper portions of the bridge pier 4a and the bridge abutments 4b and 4c, and the floor slabs 4d and 4e are installed on the upper portions of the main beams 4f to 4i. Hereinafter, in order to facilitate the understanding of description, the road surface of the floor slab 4d is considered to be horizontal, and the vertical direction of the road surface coincides with the perpendicular direction.

The acceleration sensor 2 is provided in the central portion of a side (end portion) that is substantially parallel to the regulation direction of a moving direction regulation unit for the moving object which is provided in the structure having a substantially quadrilateral shape when seen in a plan view. For example, the acceleration sensor 2 is mounted in the central portion (including substantial central portions) in the regulation direction of a side surface 4da (corresponding to the end portion according to the invention) that is parallel to (or substantially parallel to) the regulation direction of the moving direction regulation unit (for example, traffic lanes, curbstones, parapets, and the like) for the vehicle 5 which is provided on the floor slab 4d. The acceleration sensor 2 is capable of measuring acceleration generated in each of three-axis directions that intersect with each other. The acceleration sensor 2 is installed on the side surface 4da of the floor slab 4d by aligning, among three detection axes (an x axis, a y axis, and a z axis), one axis (for example, the x axis) to the vertical direction of the road surface of the floor slab 4d and aligning another axis (for example, the z axis) to the width direction of the road surface of the floor slab 4d. The acceleration sensor 2 detects acceleration along the three axes at, for example, set sampling frequencies and sends the detected acceleration data to the measurement instrument 1 through the communication network 3.

Figure 3:
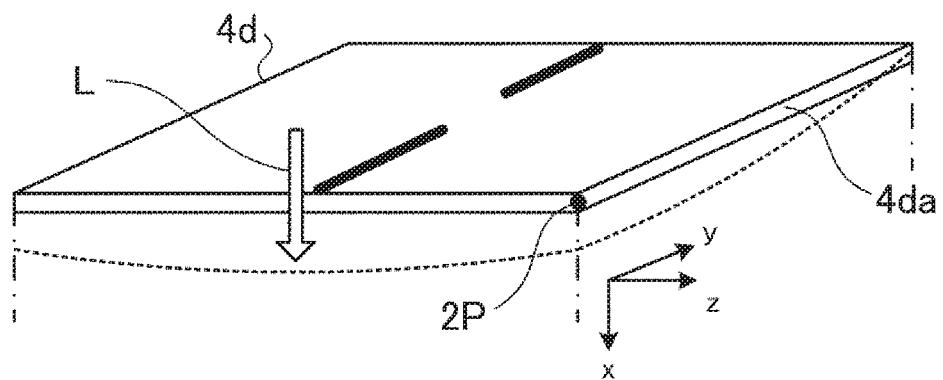
FIG. 3 is a view illustrating an example of a fashion of deformation of a floor slab.

FIG. 3 is a view illustrating an example of a fashion of the deformation of the floor slab 4d. FIG. 3 illustrates a perspective view of the floor slab 4d of FIG. 2 cut at the portion of the acceleration sensor 2.

As illustrated in FIG. 3, in a case in which the vehicle 5 passes through on the floor slab, the floor slab 4d deforms to bend downwards due to the load L of the vehicle 5. A mounting location 2P of the acceleration sensor 2 is a location farthest from the bridge pier 4a and the bridge abutment 4b, and thus the location of the floor slab 4d in the vertical direction (the location along the x axis) is likely to change more significantly than other locations. In addition, the mounting location 2P of the acceleration sensor 2 is on the side surface 4da of the floor slab 4d, and thus the slope of the floor slab 4d with respect to the horizontal direction (the slop of the z axis) is likely to be more significant than that in other locations. Therefore, when the acceleration sensor is mounted at the mounting location 2P of the floor slab 4d, the acceleration sensor 2 is capable of clearly detecting acceleration in the vertical direction or acceleration in the width direction of the floor slab 4d which is generated by the passing of the vehicle 5.

Figure 4:
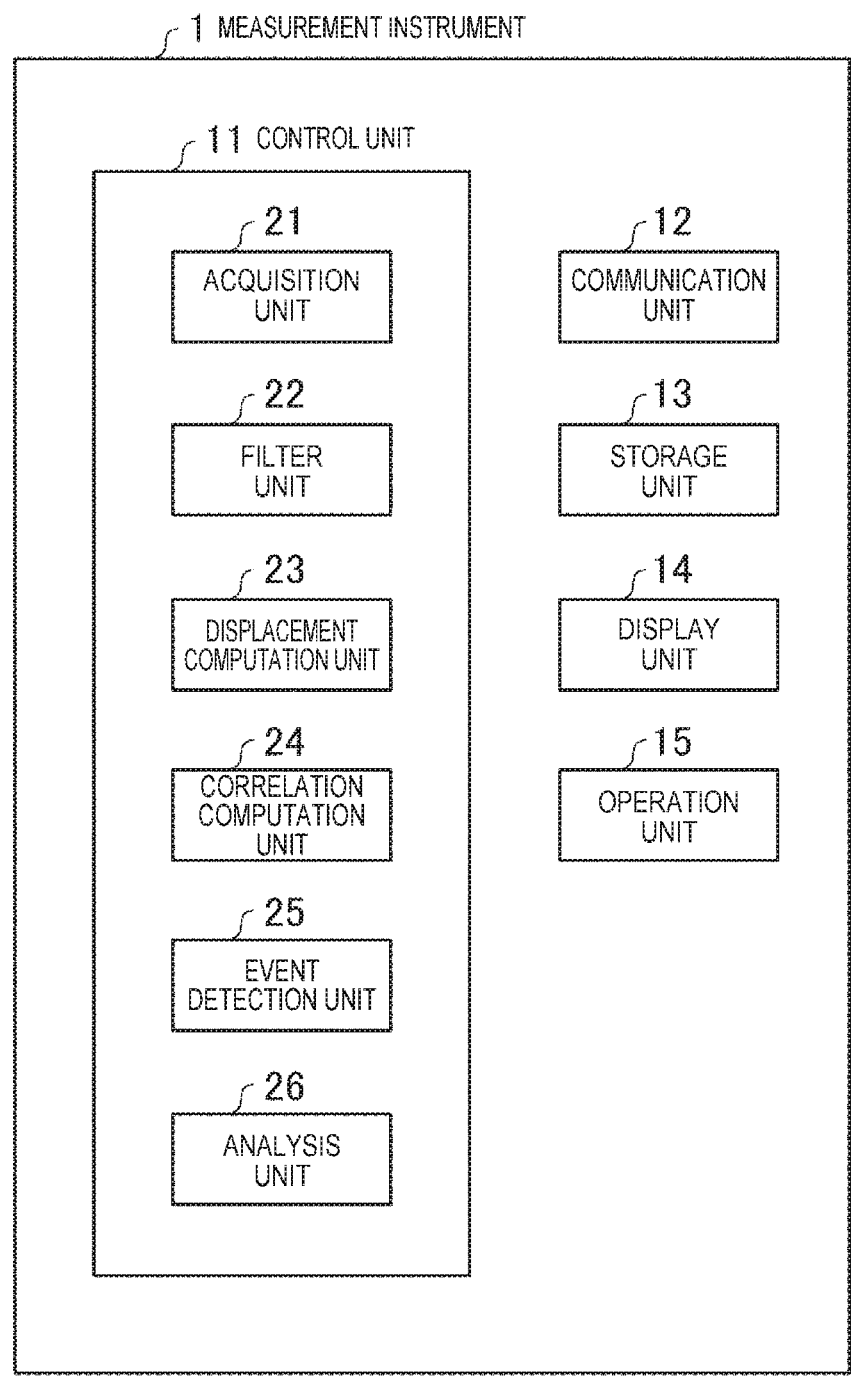
FIG. 4 is a view illustrating a constitutional example of functional blocks of a measurement instrument.

FIG. 4 is a view illustrating a constitutional example of the functional blocks of the measurement instrument 1. As illustrated in FIG. 4, the measurement instrument 1 has a control unit 11, a communication unit 12, a storage unit 13, a display unit (corresponding to an output unit according to the invention) 14, and an operation unit 15.

Although described below in detail, the control unit 11 detects events. When detecting an event, the control unit 11 analyzes the motion of the vehicle 5 that has passed through on the floor slab 4d.

The communication unit 12 receives acceleration from the acceleration sensor 2 through the communication network 3. The communication unit 12 outputs the acceleration received from the acceleration sensor 2 to the control unit 11.

The storage unit 13 stores programs, data, and the like necessary for the control unit 11 to execute computation processes or control processes. In addition, the storage unit 13 stores programs, data, and the like necessary for the control unit 11 to realize predetermined application functions. A variety of programs, data, and the like may be stored in non-volatile storage media in advance or may be received by the control unit 11 from servers through the communication network 3 and stored in the storage unit 13. The storage unit 13 is constituted of, for example, a variety of integrated circuit (IC) memories such as read only memory (ROM), flash ROM, and random access memory (RAM), recording media such as hard discs and memory cards, or the like.

The display unit 14 outputs control results and the like of the control unit 11 to a display device.

The operation unit 15 acquires operation data from users and executes processes of sending the operation data to the control unit 11.

The control unit 11 has an acquisition unit 21, a filter unit 22, a displacement computation unit 23, a correlation determination unit 24, an event detection unit 25 (corresponding to a movement detection unit according to the invention), and an analysis unit 26. The respective units in the control unit 11 have functions that are realized using, for example, central processing units (CPU) that execute programs stored in the storage unit 13. The respective units in the control unit 11 may have functions that are realized using custom integrated circuits (IC) such as application specific integrated circuits (ASIC) or may have functions that are realized using CPU and ASIC.

The acquisition unit 21 acquires the acceleration of the acceleration sensor 2 which has been sent using the communication unit 12. The acquisition unit 21 outputs vertical-direction acceleration (x-axis direction acceleration) and width-direction acceleration (z-axis direction acceleration) which are included in the acquired acceleration to the filter unit 22.

The filter unit 22 suppresses the intrinsic resonance frequency of the floor slab 4d which is included in the vertical-direction acceleration and the width-direction acceleration which have been output from the acquisition unit 21.

Figure 5:
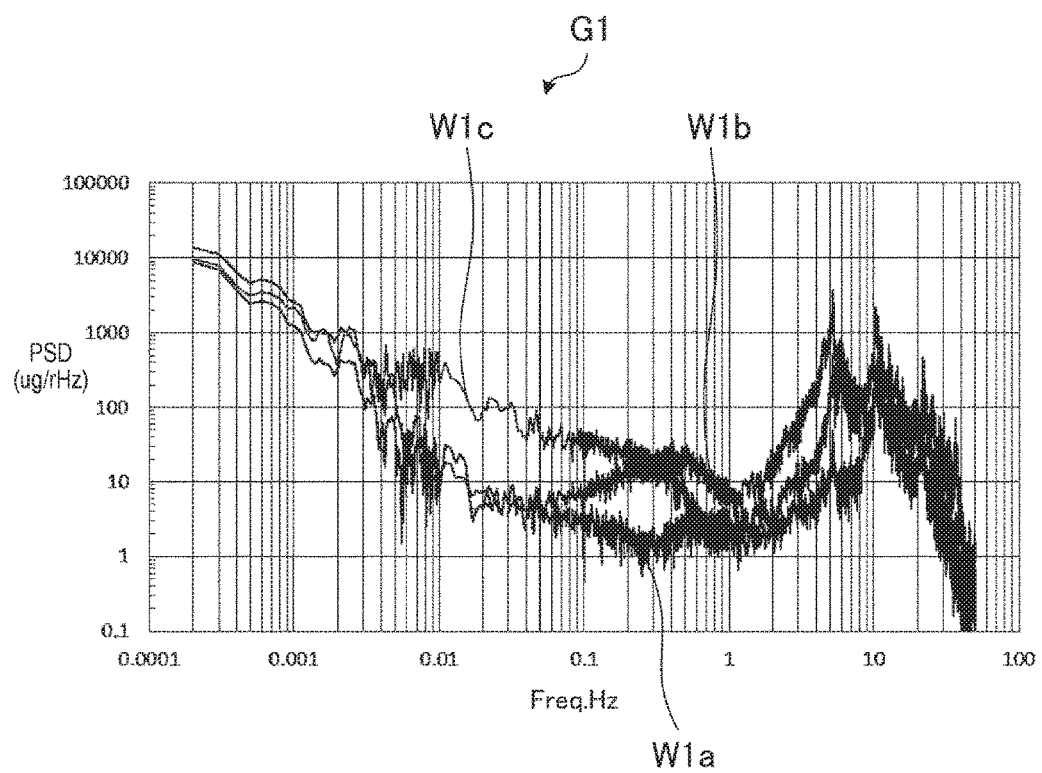
FIG. 5 is a view illustrating an example of frequency characteristics of acceleration when a vehicle passes through a floor slab.

FIG. 5 is a view illustrating an example of the frequency characteristics of acceleration when the vehicle 5 passes through the floor slab 4d. For a graph G1 illustrated in FIG. 5, the horizontal axis indicates frequency, and the vertical axis indicates power spectrum density. The length of the floor slab 4d at which the frequency characteristics of acceleration are measured is "30 m".

A waveform W1a illustrated in the graph G1 indicates the frequency characteristics of the acceleration in the x-axis direction (refer to FIG. 2) of the acceleration sensor 2 mounted on the side surface 4da of the floor slab 4d. A waveform W1b indicates the frequency characteristics of the acceleration in the y-axis direction of the acceleration sensor 2. A waveform W1c indicates the frequency characteristics of the acceleration in the z-axis direction of the acceleration sensor 2.

As illustrated in the graph G1, the acceleration in the respective axes has peaks in a range of approximately "5 Hz to 30 Hz". Several peaks near at "10 Hz" are considered to result from the intrinsic resonance of the floor slab 4d.

The acceleration illustrated in the graph G1 in a range of "0.1 Hz to 1 Hz" is regarded as acceleration generated by the deformation of the floor slab 4d which is caused by the passing of the vehicle 5 at a speed in a range of "3 m/s to 17 m/s" which are assumed as speeds necessary for the vehicle 5 to pass through the floor slab 4d. This is because, for example, when the speed of the vehicle 5 passing through the floor slab 4d is set in a range of "3 m/s to 17 m/s", the vibration cycle (a duration in which the floor slab bends downwards and then returns to the original location) generated by the deformation of the floor slab 4d which is caused by the passing of the vehicle 5 is considered to reach "10 s to 1.8 s" (0.1 Hz to 0.6 Hz) which is to the passing duration of the vehicle 5.

Frequency components that are lower than "0.01 Hz" are considered to result from the long-term cyclic changes of the floor slab 4d due to the environment such as temperature and wind or the drift of measurement devices.

According to what has been described above, the frequency characteristics of the acceleration of the floor slab 4d are generally classified into a high pass part including the intrinsic resonance frequency of the floor slab 4d and a low pass part including the frequencies of acceleration generated by the passing of the vehicle 5. For example, the frequency characteristics of acceleration illustrated in the graph G1 include the intrinsic resonance frequency of the floor slab 4d at frequencies higher than at least "1 Hz" and include the frequency components of acceleration generated by the deformation of the floor slab 4d which is caused by the passing of the vehicle 5 at frequencies of "1 Hz" or lower.

The intrinsic resonance frequency of the floor slab 4d varies depending on the structure, material, and the like of the bridge 4. In addition, the frequency components of acceleration generated by the deformation of the floor slab 4d which is caused by the passing of the vehicle 5 vary depending on the length of the floor slab 4d and the imaginary speed of the vehicle 5 passing through the floor slab 4d.

As described below, the event detection unit 25 detects the passing of the vehicle on the floor slab 4d, and the analysis unit 26 analyzes the motion of the vehicle 5 on the floor slab 4d. Therefore, the intrinsic resonance frequency components of the floor slab 4d which are included in the vertical-direction acceleration and the width-direction acceleration are information not necessary to analyze the motion of the vehicle 5 which is caused by the deformation of the floor slab. In addition, the filter unit 22 suppresses the intrinsic resonance frequency components of the floor slab 4d which are included in the vertical-direction acceleration and the width-direction acceleration.

As described above, the frequency characteristics of the acceleration of the floor slab 4d are generally classified into a high pass part including the intrinsic resonance frequency of the floor slab 4d and a low pass part including the frequencies of acceleration generated by the passing of the vehicle 5. Therefore, the filter unit 22 is constituted of, for example, a low pass filter (LPF). The cut-off frequency of LPF is set to be higher than the acceleration frequency generated by the deformation of the floor slab 4d which is caused by the passing of the vehicle 5 and is set to be lower than the intrinsic resonance frequency of the floor slab 4d. For example, in the case of the example of the frequency characteristics illustrated in the graph G1 of FIG. 5, the cut-off frequency is set to "1 Hz". In such a case, for vertical-direction acceleration and width-direction acceleration which pass through the filter unit 22, the intrinsic resonance frequency components of the floor slab 4d are blocked, and the frequency components of acceleration generated by the deformation of the floor slab 4d which is caused by the passing of the vehicle 5 pass through.

The filter unit 22 is desirably constituted of a Bessel filter so as to prevent information that waveforms of acceleration have from being lost.

In addition, as described above, the intrinsic resonance frequency of the floor slab 4d varies depending on the kind or structure of the bridge 4 and, in some cases, appears at near the frequency of acceleration generated by the deformation of the floor slab 4d which is caused by the passing of the vehicle 5. For example, in the graph G1 of FIG. 5, there are cases in which the intrinsic resonance frequency appears in a range of 1 to 10 Hz. In this case, the filter order is increased so that the intrinsic resonance frequency is sufficiently suppressed.

Description will continue with reference to FIG. 4. The vertical-direction acceleration for which the intrinsic resonance frequency components of the floor slab 4d are suppressed is input to the displacement computation unit 23 using the filter unit 22. The displacement computation unit 23 computes the vertical-direction displacement (x-axis direction displacement) of the floor slab 4d from the input vertical-direction acceleration. For example, the displacement computation unit 23 computes the vertical-direction displacement of the floor slab 4d by integrating the vertical-direction acceleration twice.

The width-direction acceleration that is output from the filter unit 22 and the vertical-direction displacement of the floor slab 4d which is output from the displacement computation unit 23 are input to the correlation determination unit 24. The correlation determination unit 24 determines the correlation between the width-direction acceleration and the vertical-direction displacement which have been input.

For example, in a case in which width-direction acceleration having a predetermined degree and vertical-direction acceleration having a predetermined degree appear at almost the same timing, the correlation determination unit 24 determines that there is a correlation between the width-direction acceleration and the vertical-direction acceleration. For example, the correlation determination unit 24 computes the covariance of the width-direction acceleration and the vertical-direction displacement and determines the correlation between the width-direction acceleration and the vertical-direction displacement.

Figure 6:
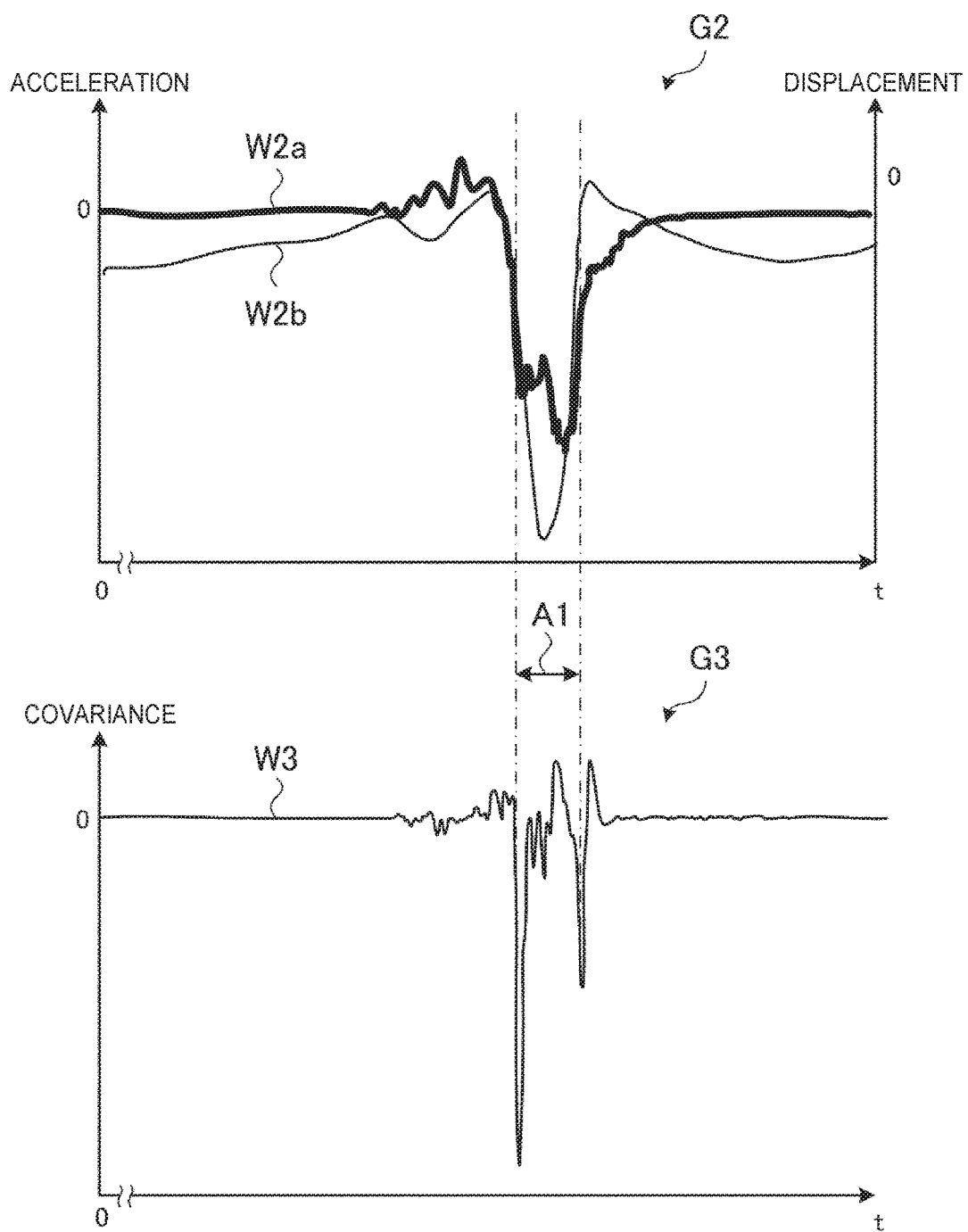
FIG. 6 is a view illustrating an example of a correlation between width-direction acceleration and vertical-direction displacement.

FIG. 6 is a view illustrating an example of a correlation between width-direction acceleration and vertical-direction displacement. For a graph G2 illustrated in FIG. 6, the horizontal axis indicates time. For the graph G2, the left vertical axis indicates acceleration, and the right vertical axis indicates displacement. For a graph G3, the horizontal axis indicates time, and the vertical axis indicates covariance between width-direction acceleration and vertical-direction displacement.

A waveform W2a in the graph G2 indicates an example of a temporal change in the width-direction acceleration. A waveform W2b in the graph G2 indicates an example of a temporal change in the vertical-direction displacement.

When the vehicle 5 passes through, the floor slab 4d bends downwards, and thus the bending generates acceleration in the width direction and in the vertical direction. Therefore, when the vehicle 5 passes through on the floor slab 4d, there is a time at which width-direction acceleration and vertical-direction displacement obtained from the vertical-direction acceleration appear at almost the same time as indicated by the waveforms W2a and W2b in a section indicated by an arrow A1.

A waveform W3 in the graph G3 indicates the covariance of the waveform W2a and the waveform W2b which are illustrated in the graph G2. When both the width-direction acceleration and the vertical-direction displacement decrease as indicated by the left dot-dashed line in the graph G2, the absolute value of the covariance of the width-direction acceleration and the vertical-direction displacement increases as indicated by the left dot-dashed line in the graph G3. In addition, when both the width-direction acceleration and the vertical-direction displacement increase as indicated by the right dot-dashed line in the graph G2, the absolute value of the covariance of the width-direction acceleration and the vertical-direction displacement increases as indicated by the right dot-dashed line in the graph G3.

In the section (time) indicated by the arrow A1, width-direction acceleration having a predetermined degree and vertical-direction acceleration having a predetermined degree appear at almost the same timing. In other words, it can be said that width-direction acceleration having a predetermined degree and vertical-direction displacement having a predetermined degree appear at almost the same timing while the absolute value of the covariance exceeds a predetermined threshold value and then exceeds a predetermined threshold value. Therefore, the correlation determination unit 24 determines that there is a correlation between width-direction acceleration and vertical-direction displacement while the absolute value of the covariance exceeds a predetermined threshold value and then exceeds a predetermined threshold value.

A computation example of the covariance will be described. The correlation determination unit 24 scans data having a certain section length at the same time from a data row of vertical-direction displacement and width-direction acceleration. In addition, the correlation determination unit executes computation of Expression (1) below.

$$C(u, t) = \frac{\sum_{i=1}^{n}(u_i - \bar{u})(t_i - \bar{t})}{n} \quad (1)$$

In Expression (1), "n" represents the number of data having a certain section length. "u" represents vertical-direction displacement. "t" represents width-direction acceleration. The section length by n data is set to be shorter than a passing duration (waveform) to be analyzed and is set to, for example, "0.2 sec" or the like. The wave amplitudes of vertical-direction displacement and width-direction acceleration which are analysis subjects are, for example, "1.5 to 2.0 sec".

Description will continue with reference to FIG. 4. In a case in which the vehicle 5 passes through, the floor slab 4d bends downwards due to the load of the vehicle 5, and acceleration is generated in the width direction and in the vertical direction. Therefore, when the vehicle 5 passes through on the floor slab 4d, a correlation is admitted between width-direction acceleration and vertical-direction displacement that is computed from the vertical-direction acceleration. Therefore, the event detection unit 25 detects an event (the passing of the vehicle 5 on the floor slab 4d) on the basis of a correlation determined by the correlation determination unit 24. For example, in a case in which the correlation determination unit 24 determines that there is a correlation between width-direction acceleration and vertical-direction displacement, the event detection unit 25 detects an event. Specifically, in an example of FIG. 6, the event detection unit 25 detects an event in the section of the arrow A1.

In a case in which the event detection unit 25 detects an event, the analysis unit 26 analyzes the motion of the vehicle 5 on the floor slab 4d. For example, the analysis unit 26 analyzes the waveforms of the width-direction acceleration generated by the event and determines the running traffic lane of the vehicle 5 that has run on the floor slab 4d. In addition, the analysis unit 26 analyzes the waveform of vertical-direction displacement generated by the event and estimates the running duration and the vehicle weight of the vehicle 5 that has run on the floor slab 4d. Hereinafter, the determination of running traffic lane of the vehicle 5 using width-direction acceleration and the estimation of the running duration and the vehicle weight of the vehicle 5 using vertical-direction displacement will be described.

First, the determination of running traffic lane of the vehicle 5 using width-direction acceleration will be described.

Figure 7:
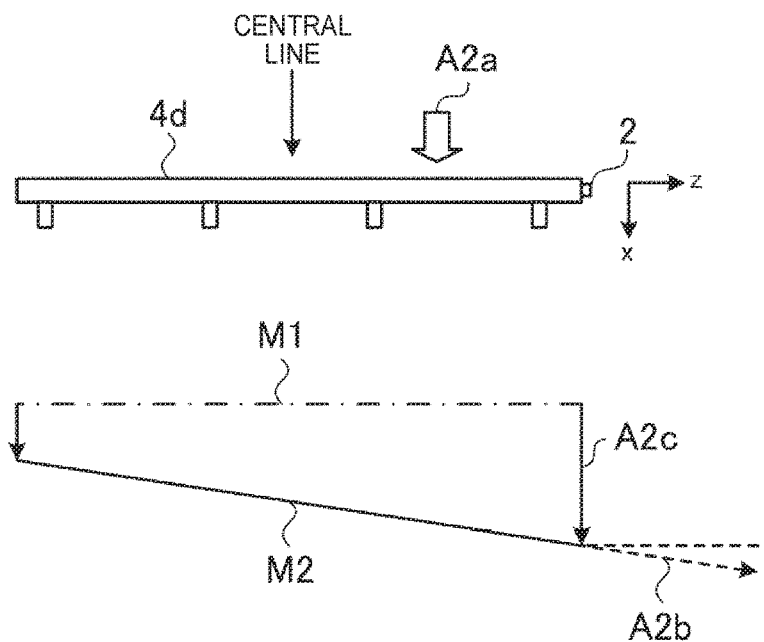
FIG. 7 is a first view illustrating a running traffic lane of a vehicle.

FIG. 7 is a first view illustrating a running traffic lane of the vehicle 5. FIG. 7 illustrates a section of the floor slab 4d and the main beams 4f to 4i illustrated in FIG. 2. In addition, FIG. 7 illustrates the acceleration sensor 2 mounted on the floor slab 4d.

A model M1 of a dot-dashed line illustrated in FIG. 7 indicates the location of the floor slab 4d when the vehicle 5 does not pass through on the floor slab 4d. A model M2 of a solid line indicates the location of the floor slab 4d when the vehicle 5 passes through a traffic lane indicated by an arrow A2a on the floor slab 4d (for example, the vehicle runs toward you from behind the paper).

When the vehicle 5 runs along the traffic lane indicated by the arrow A2a on the floor slab 4d, the floor slab 4d is inclined due to the load of the vehicle 5 so that the right-side end in the drawing is placed to be vertically lower than the left-side end as indicated by the model M2. Therefore, the z axis of the acceleration sensor 2 mounted on the floor slab 4d is inclined downwards from the horizontal direction as indicated by a dashed arrow A2b.

Figure 8:
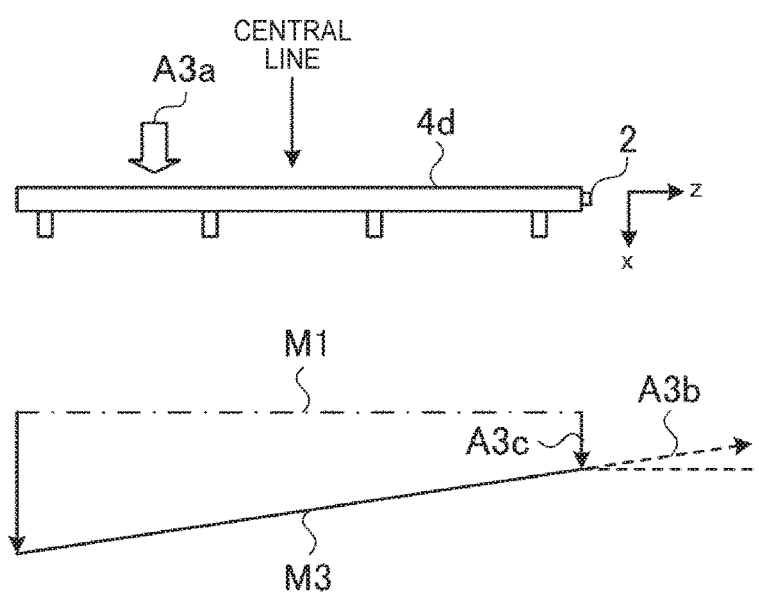
FIG. 8 is a second view illustrating a running traffic lane of a vehicle.

FIG. 8 is a second view illustrating the running traffic lane of the vehicle 5. In FIG. 8, the same components as in FIG. 7 are given the same reference sign. A model M3 of a solid line illustrated in FIG. 8 indicates the location of the floor slab 4d when the vehicle 5 passes through a traffic lane indicated by an arrow A3a on the floor slab 4d (for example, the vehicle runs toward behind the paper from you).

When the vehicle 5 runs along the traffic lane indicated by the arrow A3a on the floor slab 4d, the floor slab 4d is inclined due to the load of the vehicle 5 so that the left-side end is placed to be vertically lower than the right-side end as indicated by the model M3. Therefore, the z axis of the acceleration sensor 2 mounted on the floor slab 4d is inclined upwards from the horizontal direction as indicated by a dashed arrow A3b.

The z axis of the acceleration sensor 2 is oriented downwards or upwards with respect to the horizontal direction depending on the location of the vehicle 5 running on the floor slab 4d as indicated by the dashed arrow A2b in FIG. 7 and the dashed arrow A3b in FIG. 8. That is, the width-direction acceleration that is output from the acceleration sensor 2 has a sign which changes depending on the location (running traffic lane) of the vehicle 5 running on the floor slab 4d. For example, in a case in which the vehicle 5 runs along the traffic lane indicated by the arrow A2a in FIG. 7, the sign of the width-direction acceleration that is output from the acceleration sensor 2 becomes negative. On the other hand, in a case in which the vehicle 5 runs along the traffic lane indicated by the arrow A3a in FIG. 8, the sign of the width-direction acceleration that is output from the acceleration sensor 2 becomes positive.

According to what has been described above, the analysis unit 26 is capable of determining the running traffic lane of the vehicle 5 on the floor slab 4d using the sign of the width-direction acceleration in a section in which an event is detected using the event detection unit 25. For example, in an example of the graph G2 in FIG. 6, the waveform W2b indicating width-direction acceleration has a "negative" sign in the section of the event indicated by the arrow A1. Therefore, in the case of the example of the graph G2, the analysis unit 26 determines that the vehicle 5 runs on a traffic lane close to the side surface 4da of the floor slab 4d on which the acceleration sensor 2 is provided (the vehicle runs on a traffic lane indicated by the arrow A2a in FIG. 7).

Next, the estimation of the running duration and the vehicle weight of the vehicle 5 using vertical-direction displacement will be described.

Figure 9:
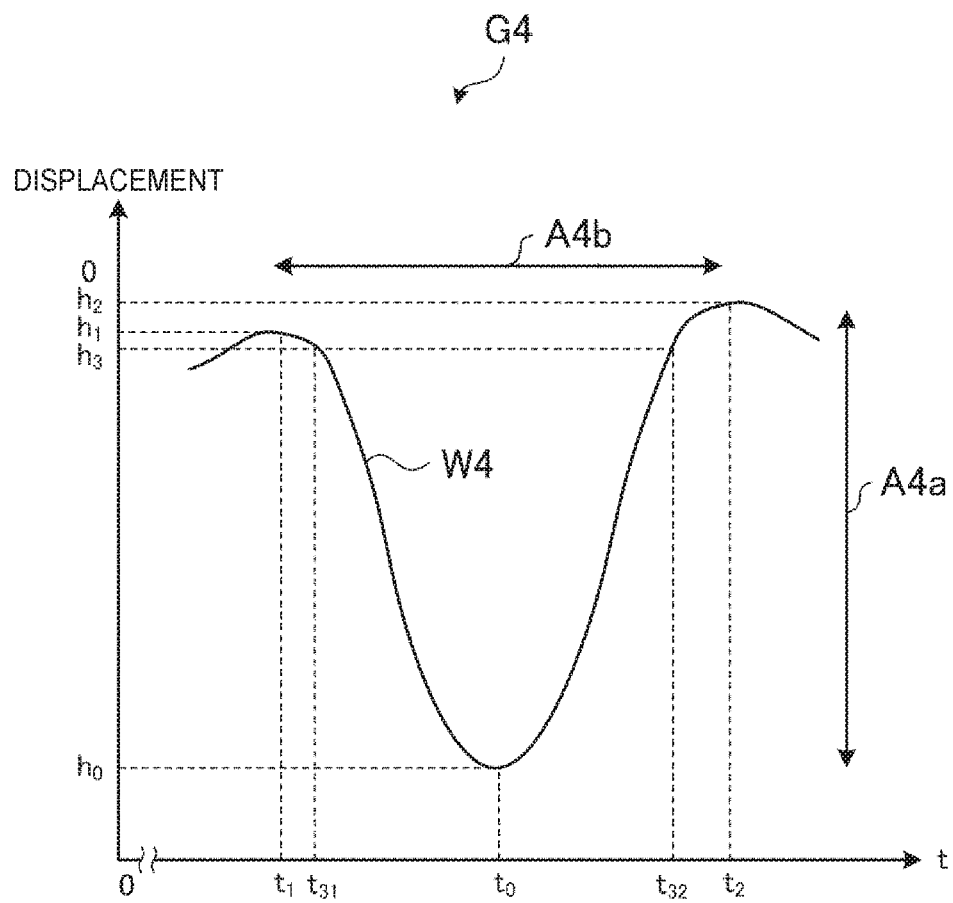
FIG. 9 is a view illustrating a running duration and vehicle weight of a vehicle.

FIG. 9 is a view illustrating the running duration and the vehicle weight of the vehicle 5. For the graph G4 in FIG. 9, the horizontal axis indicates time, and the vertical axis indicates displacement. A waveform W4 indicates the vertical-direction displacement of the floor slab 4d which is generated by an event.

First, the estimation of the vehicle weight using vertical-direction displacement will be described. The floor slab 4d bends downwards due to the vehicle weight of the vehicle 5 passing through. Therefore, there is a relationship in which the crest value indicated by an arrow A4a in the waveform W4 also increases as the vehicle weight of the vehicle 5 increases, and the vehicle weight can be estimated from the crest value of vertical-direction displacement. That is, the analysis unit 26 is capable of estimating the vehicle weight of the vehicle 5 running on the floor slab 4d from the crest value of vertical-direction displacement.

In a case in which there are two traffic lanes on the road surface of the floor slab 4d, the crest value of vertical-direction displacement changes depending on a traffic lane on which the vehicle runs in spite of the same vehicle weight of the vehicle 5 passing through the floor slab. For example, the crest value of vertical-direction displacement which is measured at a location of the acceleration sensor 2 changes between a case in which the vehicle 5 runs a traffic lane close to the acceleration sensor 2 and a case in which the vehicle 5 runs a traffic lane far from the acceleration sensor 2 in spite of the same vehicle weight (refer to the arrow A2c in FIG. 7 and an arrow A3c in FIG. 8).

Therefore, in the storage unit 13, vehicle weight information indicating the relationship between the crest values of vertical-direction displacement and vehicle weights on each traffic lane is stored in advance. For example, in the storage unit 13, first vehicle weight information indicating the relationship between the crest value of vertical-direction displacement and vehicle weights on the traffic lane close to the acceleration sensor 2 and second vehicle weight information indicating the relationship between the crest value of vertical-direction displacement and vehicle weights on the traffic lane far from the acceleration sensor 2 are stored in advance. In addition, the analysis unit 26 refers to one of the first vehicle weight information and the second vehicle weight information which are stored in the storage unit 13 on the basis of the determination result of the running traffic lane of the vehicle 5 which has been described using FIGS. 7 and 8, acquires a vehicle weight corresponding to the crest value of vertical-direction displacement in the section in which the event is detected, and estimates the vehicle weight of the vehicle 5 running on the floor slab 4d. In a case in which there is one traffic lane on the floor slab 4d, vehicle weight information for one traffic lane is stored in the storage unit 13 in advance.

The crest value of the vertical-direction displacement is regarded as, for example, a difference between an extreme value $h_2$ which is a larger one of an extreme value $h_1$ of the vertical-direction displacement before the time $t_0$ at which the vertical-direction displacement during the event is minimized and the extreme value $h_2$ of the vertical-direction displacement after the time $t_0$ at which the vertical-direction displacement is minimized and the minimum value $h_0$ of the vertical-direction displacement during the event. The definition of the crest value of the vertical-direction displacement is not limited thereto, and, for example, the minimum value $h_0$ of the vertical-direction displacement during the event may be regarded as the crest value.

Next, the estimation of the running duration using the vertical-direction displacement will be described. When the vehicle 5 runs toward the central portion of the floor slab 4d (the location on which the acceleration sensor 2 is mounted), the value of the vertical-direction displacement gradually decreases. When the vehicle 5 has run in the central portion, the value of the vertical-direction displacement is minimized, and, when the vehicle 5 runs away from the central portion, the value of the vertical-direction displacement gradually increases. Therefore, the running duration of the vehicle 5 can be estimated from, for example, the wave amplitude of the waveform W4 indicted by an arrow A4b. That is, the analysis unit 26 is capable of estimating the running duration of the vehicle 5 on the floor slab 4d from the wave amplitude of the vertical-direction displacement. In the example of the graph G4, the value of the vertical-direction displacement is minimized at a time $t_0$. Therefore, it is found that the vehicle 5 passes through the central portion of the floor slab 4d at the time $t_0$.

The wave amplitude of the vertical-direction displacement is regarded as, for example, a difference between a time $t_1$ at which the vertical-direction displacement reaches an extreme value $h_1$ before a time $t_0$ at which the vertical-direction displacement is minimized during an event and a time $t_2$ at which the vertical-direction displacement reaches an extreme value $h_2$ after a time $t_0$ at which the vertical-direction displacement is minimized. The definition of the wave amplitude of the vertical-direction displacement is not limited thereto. For example, a difference between a time $t_{31}$ at which the vertical-direction displacement generated by an event goes below a predetermined threshold value $h_3$ and a time $t_{32}$ at which the vertical-direction displacement goes above a predetermined threshold value $h_3$ may be regarded as the wave amplitude of the vertical-direction displacement.

As long as the running duration of the vehicle 5 can be estimated, it is also possible to estimate the speed of the vehicle 5. For example, the analysis unit 26 is capable of obtaining the speed of the vehicle 5 by dividing the length of the floor slab 4d by the estimated running duration.

Hereinafter, the operation of the measurement instrument 1 will be described using a flowchart.

Figure 10:
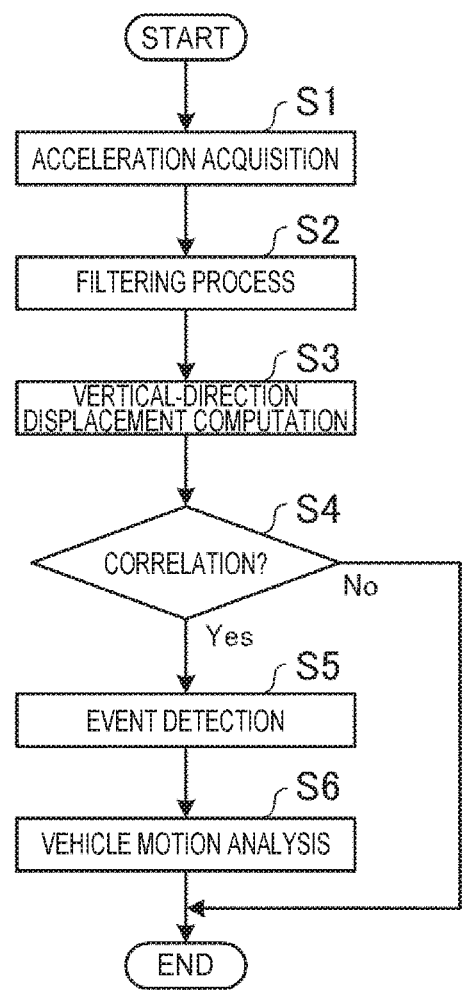
FIG. 10 is a flowchart illustrating an operation example of the measurement instrument.

FIG. 10 is a flowchart illustrating an operation example of the measurement instrument 1. The measurement instrument 1 repeatedly executes the processes in the flowchart illustrated in FIG. 10, for example, at a timing at which the acceleration sensor 2 outputs acceleration.

First, the acquisition unit 21 acquires acceleration of the acceleration sensor 2 which has been sent using the communication unit 12 (Step S1).

Next, the filter unit 22 suppresses the intrinsic resonance frequency of the floor slab 4d which is included in the vertical-direction acceleration and the width-direction acceleration which have been acquired using the acquisition unit 21 in Step S1 (Step S2).

Next, the displacement computation unit 23 computes the vertical-direction displacement of the floor slab 4d from the vertical-direction acceleration for which the intrinsic resonance frequency of the floor slab 4d is suppressed in Step S2 (Step S3). For example, the displacement computation unit 23 computes the vertical-direction displacement of the floor slab 4d by integrating the vertical-direction acceleration for which the intrinsic resonance frequency of the floor slab 4d is suppressed twice.

Next, the correlation determination unit 24 determines the correlation between the width-direction acceleration for which the intrinsic resonance frequency of the floor slab 4d is suppressed in Step S2 and the vertical-direction displacement which has been computed in Step S3 (Step S4). In a case in which it is determined that there is a correlation between the width-direction acceleration and the vertical-direction displacement ("Yes" in S4), the correlation determination unit 24 transfers the process to Step S5. In a case in which it is determined that there is no correlation between the width-direction acceleration and the vertical-direction displacement ("No" in S4), the correlation determination unit 24 terminates the process of the flowchart. In addition, the measurement instrument 1 executes the process of Step S1 again at a timing at which the acceleration sensor 2 outputs acceleration.

In Step S4, in a case in which it is determined that there is a correlation between the width-direction acceleration and the vertical-direction displacement ("Yes" in S4), the event detection unit 25 detects an event (Step S5).

Next, the analysis unit 26 analyzes the motion of the vehicle 5 on the floor slab 4d in accordance with event detection in Step S5 (Step S6). For example, the analysis unit 26 analyzes the waveform of the width-direction acceleration in an analysis section found by event detection and determines the running traffic lane of the vehicle 5 running on the floor slab 4d. In addition, the analysis unit 26 analyzes the waveform of the vertical-direction displacement generated by the event and estimates the running duration and the vehicle weight of the vehicle 5 running on the floor slab 4d. When the process of Step S6 is terminated, the measurement instrument 1 terminates the process of the flowchart, and executes the process of Step S1 again at a timing at which the acceleration sensor 2 outputs acceleration.

As described above, the acquisition unit 21 in the measurement instrument 1 acquires the width-direction acceleration and the vertical-direction displacement of the floor slab 4d from the acceleration sensor 2, and the displacement computation unit 23 computes the vertical-direction displacement of the floor slab 4d on the basis of the vertical-direction acceleration. In addition, the correlation determination unit 24 determines a correlation between the width-direction acceleration and the vertical-direction displacement, and the event detection unit 25 detects an event on the basis of the correlation. In such a case, the measurement instrument 1 is capable of detecting events from acceleration which is output from the acceleration sensor 2 without using a variety of sensors and is capable of reducing costs. In addition, the measurement instrument 1 is capable of detecting events from at least one acceleration sensor 2 and saves efforts for the installation of sensors on the floor slab 4d.

In addition, the analysis unit 26 is capable of analyzing the motion of the vehicle 5 in accordance with event detection in the event detection unit 25. In such a case, the analysis unit 26 is capable of reducing processing loads.

In addition, the filter unit 22 suppresses the intrinsic resonance frequency of the floor slab 4d which is included in the width-direction acceleration and the vertical-direction acceleration and has no relationship with the analysis of the motion of the vehicle 5. In such a case, the event detection unit 25 is capable of appropriately detecting events. In addition, the analysis unit 26 is capable of appropriately analyzing the motion of the vehicle 5.

In the above description, the analysis unit 26 analyzes the waveforms of the width-direction acceleration and the vertical-direction displacement, but may analyze the waveform of at least one of them. For example, the analysis unit 26 may determine the running traffic lane of the vehicle 5 by analyzing only the waveform of the width-direction acceleration or may estimate the vehicle weight and the passing duration of the vehicle 5 by analyzing only the waveform of the vertical-direction displacement.

In addition, in a case in which an event is detected, the event detection unit 25 may store width-direction acceleration and vertical-direction acceleration which are generated by the event in the storage unit 13. In addition, the analysis unit 26 may analyze the motion of the vehicle 5 on the basis of the width-direction acceleration and the vertical-direction acceleration which are stored in the storage unit. In this case, the analysis unit 26 may not analyze the motion of the vehicle 5 in Step S6 in FIG. 10. For example, the analysis unit 26 may refer to the storage unit 13 and analyze the motion of the vehicle 5 according to users' request. In this case, a tag is assigned to the event. This is to enable the storage unit 13 to be referred to according to requests. For example, the system further includes a standard time unit and assigns time information.

In addition, in the above description, the correlation determination unit 24 determined the correlation between the width-direction acceleration and the vertical-direction displacement, but may determine the correlation between width-direction acceleration and vertical-direction acceleration. In this case, the displacement computation unit 23 which computes vertical-direction displacement from vertical-direction acceleration becomes unnecessary.

In addition, the correlation determination unit 24 may determine the correlation between width-direction displacement and vertical-direction displacement. In this case, the displacement computation unit 23 also computes width-direction displacement by integrating the width-direction acceleration twice.

In addition, the correlation determination unit 24 may determine the correlation between width-direction displacement and vertical-direction acceleration.

In addition, the display unit 14 may output the results of event detection detected using the event detection unit 25, the analysis results of the motion of the vehicle 5 which are analyzed using the analysis unit 26, and the like to display devices. In such a case, users are able to learn, for example, the number, running traffic lanes, vehicle weight, and the like of the vehicles 5 passing through on the floor slab 4*d*.

In addition, the analysis unit 26 may estimate the running duration and the vehicle weight of the vehicle 5 that has run on the floor slab 4*d* from the crest value and the wave amplitude of the width-direction acceleration. Since vertical-direction displacement changes more due to the passing of the vehicle 5 than width-direction acceleration, the running duration and the vehicle weight of the vehicle 5 are desirably estimated using vertical-direction displacement.

In addition, the event detection unit 25 may detect events on the basis of the correlation between width-direction acceleration and vertical-direction displacement and the correlation between width-direction acceleration and vertical-direction acceleration. For example, the event detection unit 25 may detect events in a case in which there is a correlation between width-direction acceleration and vertical-direction displacement and a correlation between width-direction acceleration and vertical-direction acceleration.

In addition, the acquisition unit 21 may acquire travelling-direction acceleration (y-axis direction acceleration). In addition, the correlation determination unit 24 may determine the correlation between width-direction acceleration and vertical-direction acceleration.

In addition, the event detection unit 25 may detect events depending on whether or not the covariance of the correlation exceeds a threshold value. The event detection unit 25 specifies a time section that is analyzed from the covariance. The event detection unit 25 specifies a wide time section before and after the peak time width of the covariance as the analysis section. The degree of this time section being widened is stored in the storage unit 13.

Second Embodiment

In a second embodiment, the preservation (storage) of width-direction acceleration and vertical-direction displacement when an event is generated will be described.

Figure 11:
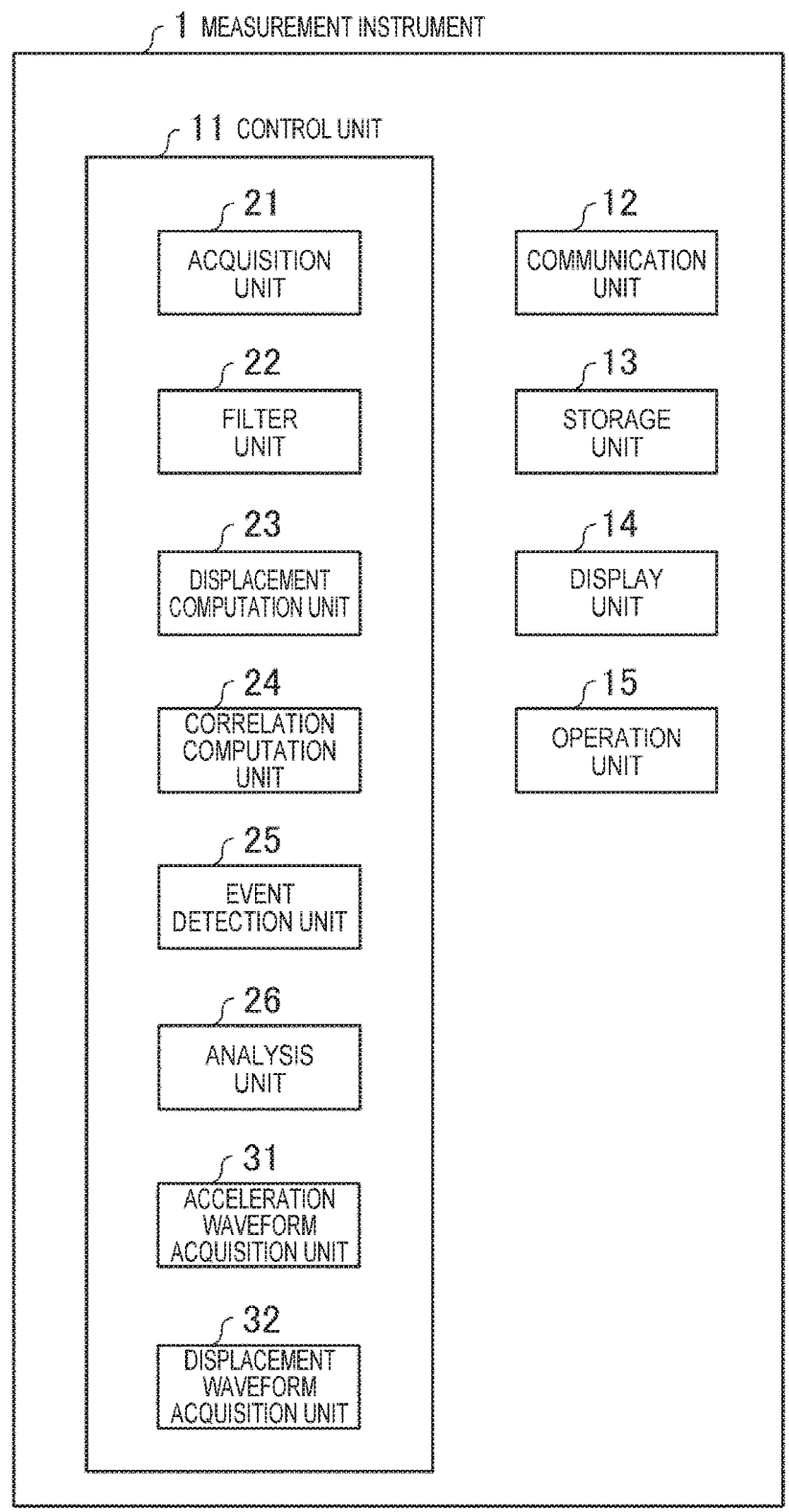
FIG. 11 is a view illustrating an example of functional blocks of a measurement instrument according to a second embodiment.

FIG. 11 is a view illustrating an example of the functional blocks of the measurement instrument 1 according to a second embodiment. In FIG. 11, the same components as in FIG. 4 are given the same reference sign and will not be described again. As illustrated in FIG. 11, the measurement instrument 1 has an acceleration waveform acquisition unit 31 and a displacement waveform acquisition unit 32.

In a case in which an event is detected using the event detection unit 25, the acceleration waveform acquisition unit 31 acquires the characteristic information of the waveform of width-direction acceleration generated by the event. Although described below in detail, the characteristic information is about, for example, the crest value, wave amplitude, and waveform coefficient of the width-direction acceleration and a time at which the vehicle 5 passes through the acceleration sensor 2. The acceleration waveform acquisition unit 31 stores the acquired characteristic information of the width-direction acceleration in the storage unit 13.

The waveform of the width-direction acceleration generated by the event has an approximately trapezoidal shape. Therefore, even when not all the data of the width-direction acceleration generated by the event is stored in the storage unit 13, it is possible to execute the approximate restoration of the waveform of the width-direction acceleration in a trapezoidal shape by storing the characteristic information in the storage unit 13. That is, the analysis unit 26 is capable of restoring trapezoidal width-direction acceleration from the characteristic information stored in the storage unit 13 and is capable of analyzing the motion of the vehicle 5, for example, even later on according to users' request and the like.

Figure 12:
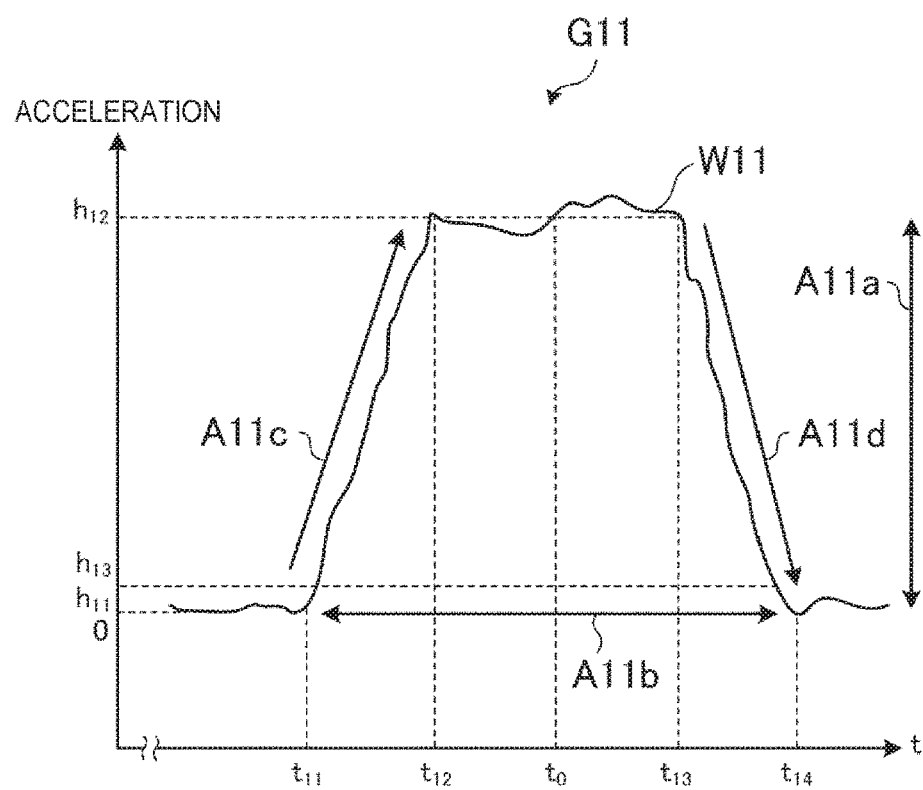
FIG. 12 is a view illustrating characteristic information of width-direction acceleration and restoration of the width-direction acceleration from the characteristic information.
Figure 12:
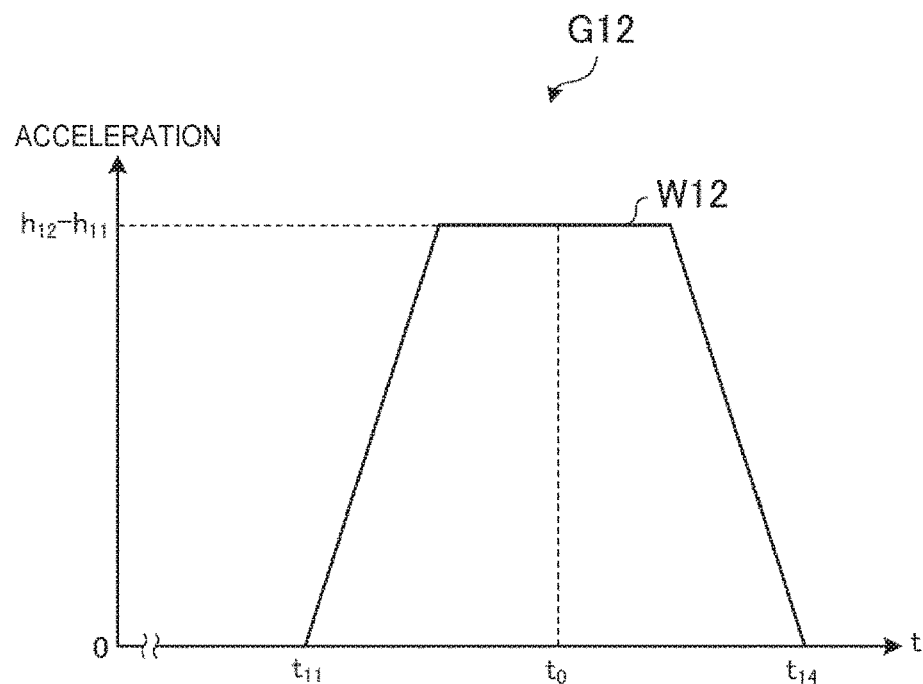

FIG. 12 is a view illustrating the characteristic information of the width-direction acceleration and the restoration of the width-direction acceleration from the characteristic information. For graphs G11 and G12 illustrated in FIG. 12, the horizontal axis indicates time, and the vertical axis indicates acceleration.

A waveform W11 illustrated in the graph G11 indicates width-direction acceleration generated by the event. A waveform W12 illustrated in the graph G12 indicates width-direction acceleration restored from the characteristic information stored in the storage unit 13.

The acceleration waveform acquisition unit 31 acquires the characteristic information of the waveform W11. For example, the acceleration waveform acquisition unit 31 acquires the crest value indicated by an arrow A11*a* in the graph G11 and the wave amplitude indicated by an arrow A11*b*. In addition, the acceleration waveform acquisition unit 31 acquires the waveform coefficient indicated by an arrow A11*c* (the slope of the increasing width-direction acceleration) and the waveform coefficient indicated by an arrow A11*d* (the slope of the decreasing width-direction acceleration). In addition, the acceleration waveform acquisition unit 31 acquires a time $t_0$ at which the vehicle 5 passes through the acceleration sensor 2.

The crest value of the width-direction acceleration is regarded as, for example, a difference between a value $h_{11}$ at which the value of the width-direction acceleration before the event is almost constant and a value $h_{12}$ at which the value of the width-direction acceleration during the event peaks and is expressed as the following expression.

Crest value=$h_{12}-h_{11}$

The value $h_{11}$ may be set to "0".

The wave amplitude is regarded as, for example, a difference between a time $t_{11}$ at which the value of the width-direction acceleration begins to increase and a time $t_{14}$ at which the value of the width-direction acceleration stops to decrease and is expressed as the following expression.

Wave amplitude=$t_{14}-t_{11}$

The waveform coefficient of the increasing width-direction acceleration is regarded as, for example, the slope of the width-direction acceleration obtained from the time $t_{11}$ at which the value of the width-direction acceleration begins to increase, a time $t_{12}$ at which the width-direction acceleration reaches the value $h_{12}$, and the crest value and is expressed as the following expression.

Waveform coefficient=$(h_{12}-h_{11})/(t_{12}-t_{11})$

The waveform coefficient of the decreasing width-direction acceleration is regarded as, for example, the slope of the width-direction acceleration obtained from a time $t_{13}$ at which the value of the width-direction acceleration during the event begins to decrease, the time $t_{14}$ at which the width-direction acceleration reaches the value $h_{11}$, and the crest value and is expressed as the following expression.

Waveform coefficient=$(h_{11}-h_{12})/(t_{14}-t_{13})$

The time $t_0$ at which the vehicle 5 passes through the acceleration sensor 2 is regarded as, for example, a time at which the value of the vertical-direction displacement is maximized (for example, refer to the time $t_0$ in FIG. 9).

The definition of the characteristic information is not limited thereto. For example, the crest value may be regarded as the maximum value of the value of the width-direction acceleration generated by the event. In addition, the wave amplitude may be regarded as a difference between a time at which the value of the width-direction acceleration generated by the event exceeds a predetermined threshold value $h_{13}$ and a time at which the crest value turns to be below the predetermined threshold value $h_{13}$. In addition, in the above description, the case of the positive width-direction acceleration has been described; however, even in the case of negative width-direction acceleration, the characteristic information of width-direction acceleration and width-direction acceleration from the characteristic information can be restored.

The acceleration waveform acquisition unit 31 stores the acquired characteristic information in the storage unit 13. In such a case, the analysis unit 26 is capable of restoring the width-direction acceleration generated by the event as a trapezoidal waveform as indicated by the waveform W12 from the characteristic information stored in the storage unit 13. For example, the analysis unit 26 increases the width-direction acceleration up to the crest value "$h_{12}-h_{11}$" using the waveform coefficient of the increasing width-direction acceleration and the time $t_{11}$ which is a time traced back from the time $t_0$ by half the wave amplitude as a starting point. In addition, the analysis unit 26 increases the width-direction acceleration up to the crest value "$h_{12}-h_{11}$" using the waveform coefficient of the increasing width-direction acceleration and the time $t_{14}$ which is a time traced back from the time $t_0$ by half the wave amplitude as a starting point. In addition, the analysis unit 26 restores the width-direction acceleration generated by the event by connecting two points at times at which the width-direction acceleration is increased up to the crest value.

Description will continue with reference to FIG. 11. In a case in which an event is detected using the event detection unit 25, the displacement waveform acquisition unit 32 acquires the characteristic information of the waveform of vertical-direction displacement generated by the event. Although described below in detail, the characteristic information is about, for example, the crest value and the wave amplitude of the vertical-direction displacement and a time at which the vehicle 5 passes through the acceleration sensor 2. The displacement waveform acquisition unit 32 stores the acquired characteristic information of the vertical-direction displacement in the storage unit 13.

The waveform of the vertical-direction displacement generated by the event is approximated using Expression (2) below.

$$u(t) = h_u \cdot a^{-\left(\frac{t-t_0}{w_u}\right)^2} \tag{1}$$

In Expression (2), "$h_u$" represents the crest value of the vertical-direction displacement, and "$w_u$" represents the wave amplitude of the vertical-direction displacement. "$t_0$" represents the time at which the vehicle 5 passes through the acceleration sensor 2 and, for example, a time at which the vertical-direction displacement during the event reaches the minimum value. "a" represents the waveform coefficient and a constant determined by the floor slab 4*d*. The waveform may be approximated using "$t_0$" as a boundary and Expression (2) (the right side and the left side of the waveform may be separately approximated).

Therefore, even when not all the data of the vertical-direction displacement generated by the event is stored in the storage unit 13, it is possible to compute the waveform of the vertical-direction displacement from Expression (2) by storing the characteristic information in the storage unit 13. That is, the analysis unit 26 is capable of restoring the vertical-direction displacement from the characteristic information stored in the storage unit 13 and is capable of analyzing the motion of the vehicle 5, for example, even later on according to users' request and the like.

Figure 13:
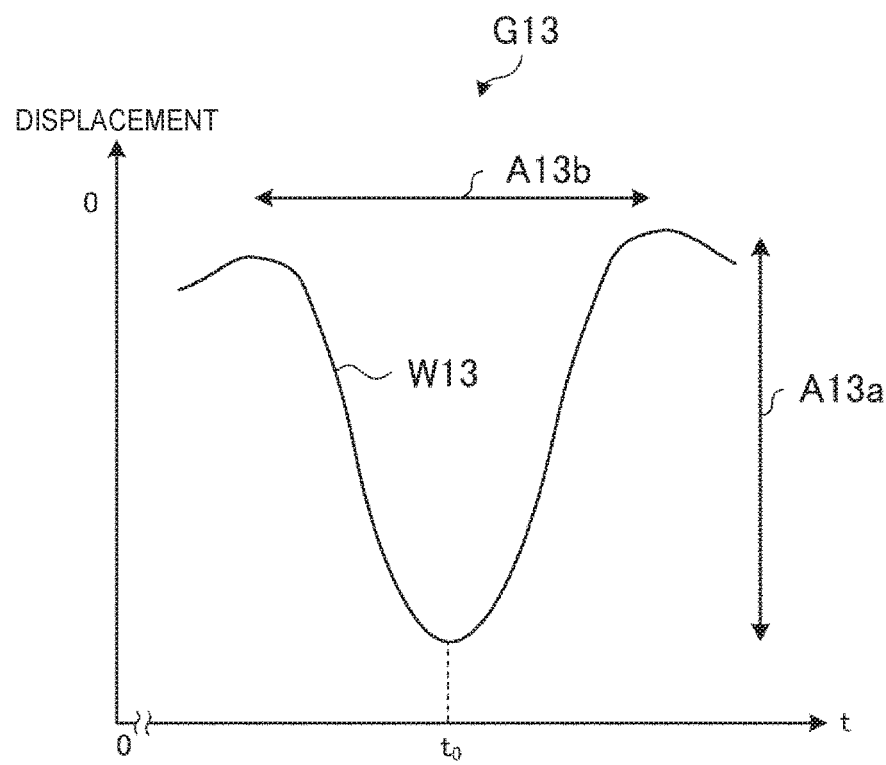
FIG. 13 is a view illustrating characteristic information of vertical-direction displacement and restoration of the vertical-direction displacement from the characteristic information.
Figure 13:
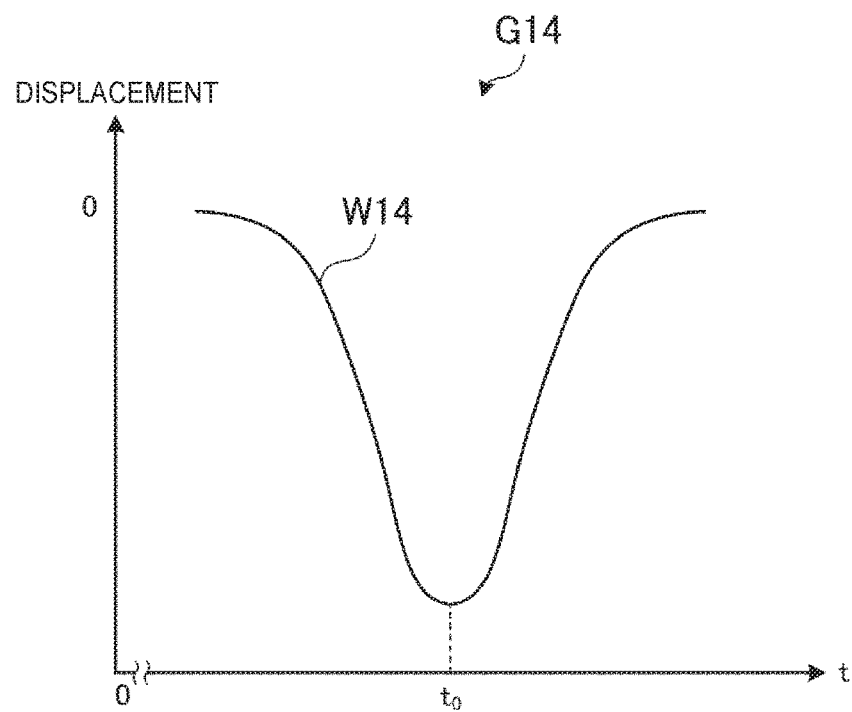

FIG. 13 is a view illustrating the characteristic information of the vertical-direction displacement and the restoration of the vertical-direction displacement from the characteristic information. For graphs G13 and G14 illustrated in FIG. 13, the horizontal axis indicates time, and the vertical axis indicates displacement.

A waveform W13 illustrated in the graph G13 indicates the vertical-direction displacement generated by the event. A waveform W14 illustrated in the graph G14 indicates the vertical-direction displacement restored from the characteristic information stored in the storage unit 13.

The displacement waveform acquisition unit 32 acquires the characteristic information of the waveform W13. For example, the displacement waveform acquisition unit 32 acquires the crest value indicated by an arrow A13*a* in the graph G13 and the wave amplitude indicated by an arrow A13*b*. In addition, the displacement waveform acquisition unit 32 acquires the time $t_0$ at which the vehicle 5 passes through the acceleration sensor 2. The crest value and the wave amplitude of the vertical-direction displacement are identical to the crest value and the wave amplitude which have been described using FIG. 9 and will not be described.

The displacement waveform acquisition unit 32 stores the acquired characteristic information in the storage unit 13. In such a case, the analysis unit 26 is capable of restoring the vertical-direction displacement generated by the event as a waveform as indicated by the waveform W14 using the characteristic information stored in the storage unit 13 and Expression (2). For example, the analysis unit 26 substitutes the crest value "$h_u$" stored in the storage unit 13, the wave amplitude "$w_u$", and the time "$t_0$" at which the vehicle 5 passes through the acceleration sensor 2 into Expression (2). In such a case, the analysis unit 26 is capable of restoring the vertical-direction displacement generated by the event and is capable of analyzing the motion of the vehicle 5, for example, even later on according to users' request and the like.

The waveform coefficient "a" in Expression (2) is computed in advance for every floor slab 4d. For example, the actual measurement values of the crest value and the wave amplitude of the vertical-direction displacement and the time at which the vehicle 5 passes through the acceleration sensor 2 are substituted into Expression (2). In addition, the waveform coefficient "a" is computed in advance so that the waveform in Expression (2) is most approximated to the waveform of actual vertical-direction displacement by comparing the waveform indicated by Expression (2) and the waveform of actual vertical-direction displacement when actual values are measured.

The flowchart of the measurement instrument 1 according to the second embodiment is identical to that in FIG. 10. However, after the process of Step S5 or Step S6, a storage process of the characteristic information of the waveforms is executed using the acceleration waveform acquisition unit 31 and the displacement waveform acquisition unit 32.

In the measurement instrument 1 according to the second embodiment, the processes of vehicle motion analysis of Step S6 may not be executed. The processes of vehicle motion analysis may be executed according to, for example, user's request and the like. For example, when a user makes an analysis request, the analysis unit 26 acquires the characteristic information stored in the storage unit 13 and restores horizontal-direction acceleration and vertical-direction displacement which are generated by the event from the acquired characteristic information. In addition, the analysis unit 26 may estimate the traffic lanes, vehicle weight, running duration, and speed of the vehicle 5 running on the floor slab 4d from the horizontal-direction acceleration and vertical-direction displacement which have been restored.

As described above, in a case in which an event is detected using the event detection unit 25, the acceleration waveform acquisition unit 31 acquires the characteristic information of the waveform of the width-direction acceleration generated by the event. In addition, the displacement waveform acquisition unit 32 acquires in a case in which an event is detected using the event detection unit 25, the characteristic information of the waveform of the vertical-direction displacement generated by the event. In such a case, the storage unit 13 is capable of reducing storage capacity.

In addition, the analysis unit 26 is capable of restoring the width-direction acceleration or the vertical-direction displacement from the characteristic information stored in the storage unit 13 and is thus capable of analyzing the motion of the vehicle 5 on the floor slab 4d, for example, even later on according to users' request and the like.

The acceleration waveform acquisition unit 31 may acquire the characteristic information of the width-direction acceleration that is output from the acceleration sensor 2 and store the characteristic information in the storage unit 13 or may acquire the characteristic information of the width-direction acceleration that has been filtered using the filter unit 22 and store the characteristic information in the storage unit 13. In addition, the acceleration waveform acquisition unit 31 may acquire the characteristic information of the above-described two kinds of width-direction acceleration and store the characteristic information in the storage unit 13.

Third Embodiment

In a third embodiment, the envelope curve of vertical-direction acceleration is computed, and the vibrations of a floor slab are detected from the computed envelope curve. In addition, in a case in which the vibrations of a floor slab are detected, the correlation determination unit determines correlations.

Figure 14:
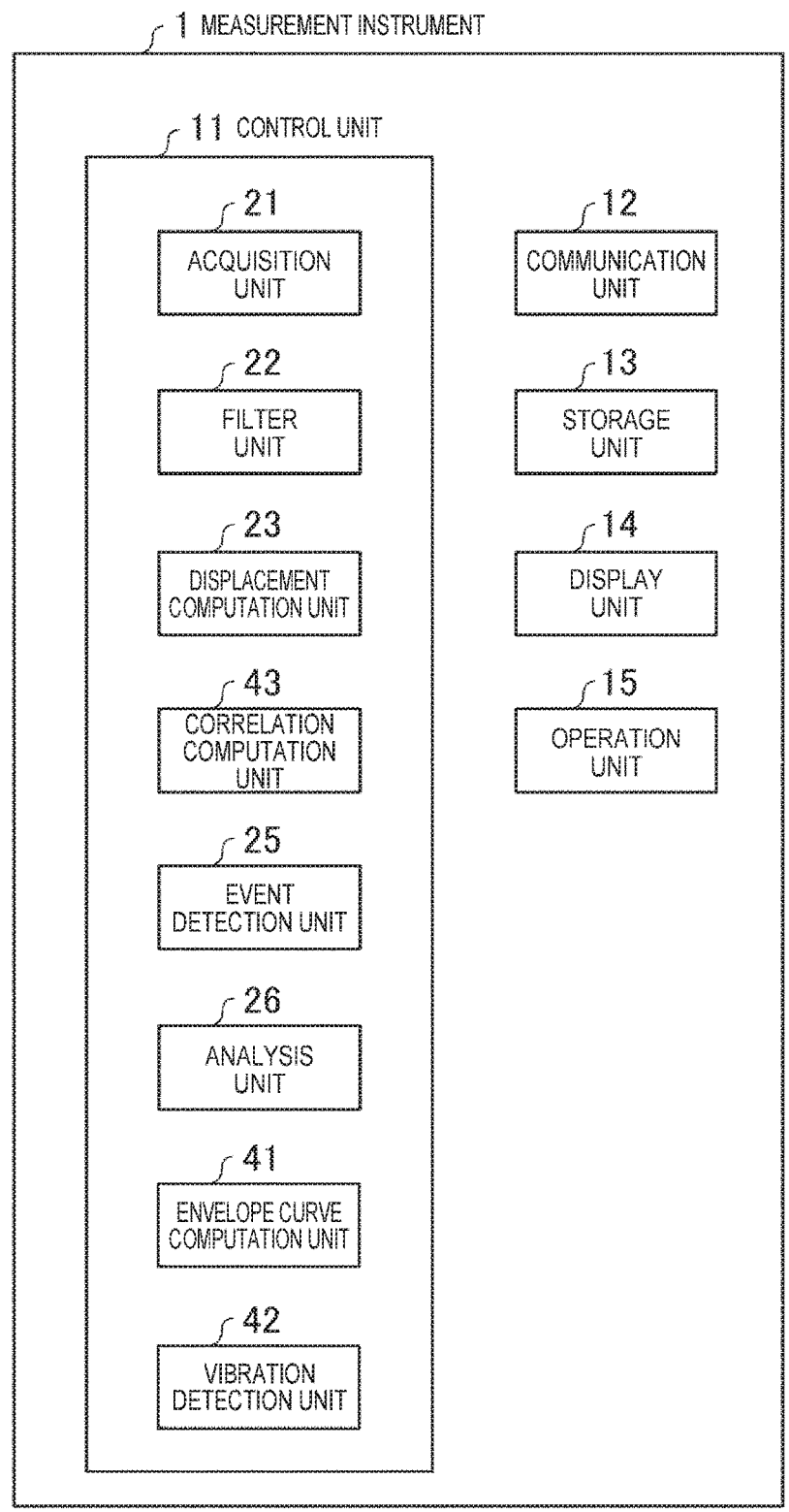
FIG. 14 is a view illustrating an example of functional blocks of a measurement instrument according to a third embodiment.

FIG. 14 is a view illustrating an example of the functional blocks of the measurement instrument 1 according to the third embodiment. In FIG. 14, the same components as in FIG. 4 are given the same reference sign and will not be described again. As illustrated in FIG. 14, the measurement instrument 1 has an envelope curve computation unit 41 and a vibration detection unit 42.

The vertical-direction acceleration acquired using the acquisition unit 21 is input to the envelope curve computation unit 41. The envelope curve computation unit 41 computes the absolute value of the input vertical-direction acceleration and computes the envelope curve (signal) of the computed absolute value.

Figure 15:
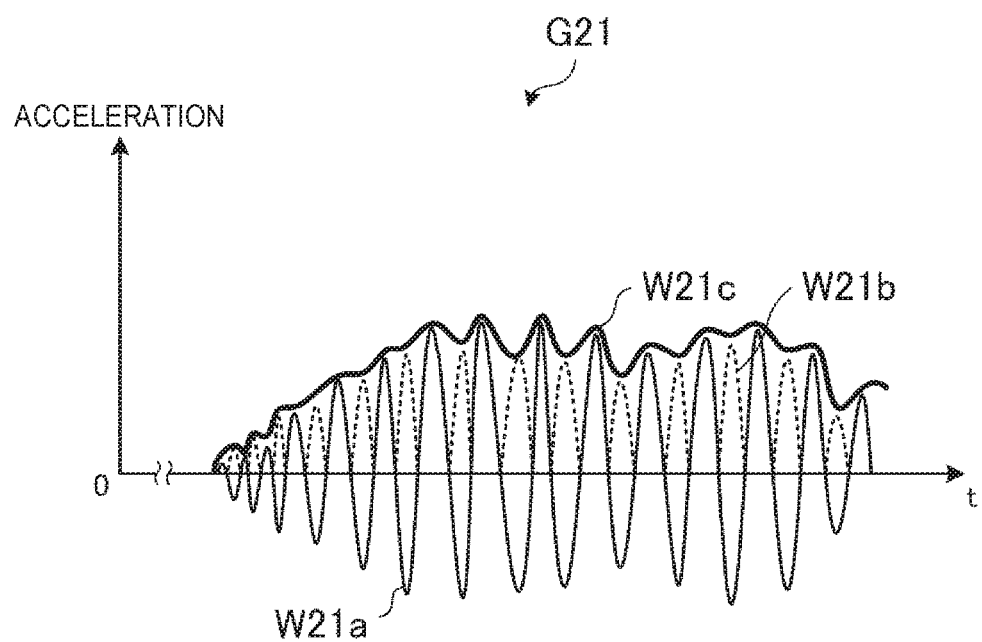
FIG. 15 is a view illustrating an example of an envelope curve.

FIG. 15 is a view illustrating an example of the envelope curve. For a graph G21 illustrated in FIG. 15, the horizontal axis indicates time, and the vertical axis indicates acceleration.

A waveform W21a illustrated in the graph G21 indicates the vertical-direction acceleration that is input to the envelope curve computation unit 41. The waveform W21b indicated by the dashed line indicates the vertical-direction acceleration of which the absolute value has been computed using the envelope curve computation unit 41. That is, the waveform W21b is a waveform obtained by inverting negative portions in the waveform W21a to be positive. A waveform W21c indicates an envelope curve computed using the envelope curve computation unit 41.

Vibrations of the floor slab 4d are generated by the passing of the vehicle 5 and also generated by a variety of environmental causes. The vertical-direction acceleration acquired using the acquisition unit 21 is input to the envelope curve computation unit 41 without passing through the filter unit 22, and the envelope curve computation unit 41 computes the envelope curve of the vertical-direction acceleration. Therefore, the envelope curve computation unit 41 computes the envelope curve of the vertical-direction acceleration of the floor slab 4d which is generated by a variety of causes.

Description will continue with reference to FIG. 14. The vibration detection unit 42 detects the vibrations of the floor slab 4d on the basis of the envelope curve of the vertical-direction acceleration computed using the envelope curve computation unit 41. For example, in a case in which the amplitude of the envelope curve of the vertical-direction acceleration exceeds a predetermined threshold value, the vibration detection unit 42 detects that the floor slab 4d vibrates.

As described above, the envelope curve computation unit 41 computes the envelope curve of the vertical-direction acceleration of the floor slab 4d which is generated by a variety of causes. Therefore, the vibration detection unit 42 detects the vibrations of the floor slab 4d which are generated by a variety of causes. That is, the vibration detection unit 42 detects the vibrations of the floor slab 4d which are generated by the passing of the vehicle 5 or environmental vibrations.

The correlation determination unit 43 determines the correlation between width-direction acceleration and vertical-direction displacement in the same manner as the correlation determination unit 24 illustrated using FIG. 4. However, the correlation determination unit 43 in FIG. 14 is different in that the correlation determination unit detects the correlation in a case in which the correlation is computed in a case in which the vibrations of the floor slab 4d are detected using the vibration detection unit 42.

Generally, the correlation determination unit 24 in FIG. 4 determines the correlation between width-direction acceleration and vertical-direction displacement. On the other hand, the correlation determination unit 43 in FIG. 14 determines the correlation between width-direction acceleration and vertical-direction displacement in a case in which the vibrations of the floor slab 4d are detected using the vibration detection unit 42. That is, in a case in which the correlation determination unit 43 determines the correlation between width-direction acceleration and vertical-direction displacement in a case in which the floor slab 4d is vibrated due to the passing of the vehicle 5 or environmental vibrations. In such a case, it is possible to reduce the processing loads of the correlation determination unit 43.

In a case in which the vehicle 5 passes through, the floor slab 4d bends downwards due to the load of the vehicle. On the other hand, in the case of environmental vibrations, unlike the case of the vehicle 5, no loads are applied to the floor slab 4d, and thus the floor slab does not bend downwards as much as when the vehicle 5 passes through. Therefore, the correlation between width-direction acceleration and vertical-direction displacement which is generated due to environmental loads is not admitted as a correlation as great as the correlation between width-direction acceleration and vertical-direction displacement which is generated by the passing of the vehicle 5.

Figure 16:
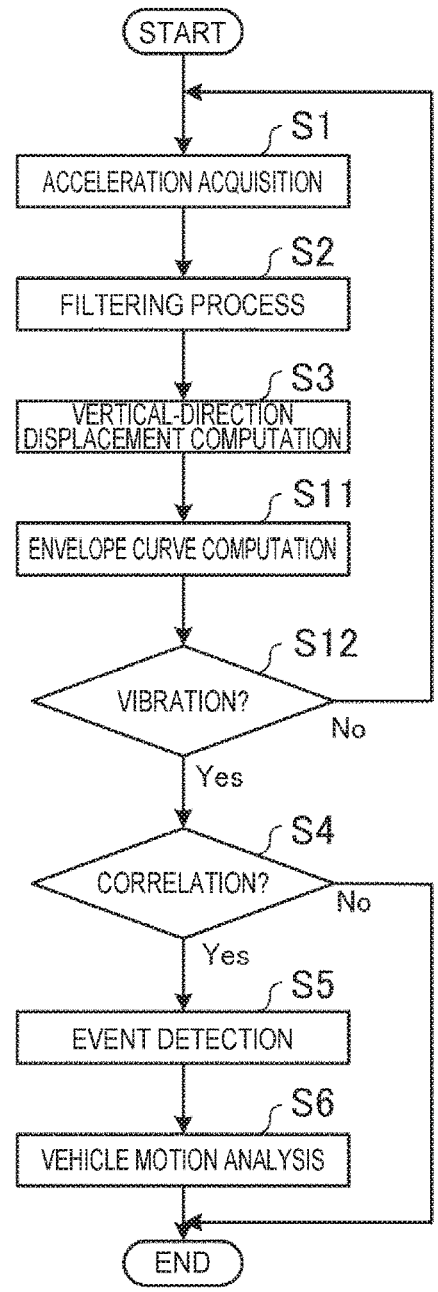
FIG. 16 is a flowchart illustrating an operation example of the measurement instrument.

FIG. 16 is a flowchart illustrating the operation example of the measurement instrument 1. In the flowchart of FIG. 16, the same processes as those in FIG. 10 are given the same reference sign and will not be described again.

In Step S11 in FIG. 16, the envelope curve computation unit 41 computes the envelope curve of the absolute value of the vertical-direction acceleration which has been acquired using the acquisition unit 21 in Step S1.

Next, the vibration detection unit 42 detects the vibrations of the floor slab 4d on the basis of the envelope curve computed in Step S11 (Step S12). For example, in a case in which the envelope curve computed in Step S11 exceeds a predetermined threshold value, the vibration detection unit 42 detects that the floor slab 4d has been vibrated. In a case in which the vibrations of the floor slab 4d are not detected ("No" in S12), the vibration detection unit 42 transfers the process to Step S1. In a case in which the vibrations of the floor slab 4d are detected ("Yes" in S12), the vibration detection unit 42 transfers the process to Step S4. That is, in a case in which the floor slab 4d is vibrated, the correlation determination unit 24 is caused to execute a determination process of the correlation between width-direction acceleration and the vertical-direction displacement.

In the above-described flowchart, the processes of Steps S1 to S3 are executed even when the floor slab 4d is not vibrated, but the processes of Steps S1 to S3 may be executed only in a case in which the floor slab 4d is vibrated. For example, the processes of Steps S11 and S12 may be executed before the process of Step S1 in FIG. 16.

As described above, the envelope curve computation unit 41 computes the envelope curve of vertical-direction acceleration, and the vibration detection unit 42 detects the vibrations of the floor slab 4d on the basis of the envelope curve computed using the envelope curve computation unit 41. In addition, in a case in which the vibration detection unit 42 detects the vibrations of the floor slab 4d, the correlation determination unit 24 determines the correlation between width-direction acceleration and vertical-direction displacement. In such a case, since the correlation determination unit 24 executes the determination process when the floor slab 4d is vibrated, it is possible to reduce processing loads.

In addition, since the correlation determination unit 24 detects an event after the vibration detection unit 42 detects the vibrations of the floor slab 4d, it is possible to improve the accuracy of event detection.

In addition, the envelope curve computation unit 41 may compute the envelope curve of width-direction acceleration, and the vibration detection unit 42 may detect the vibrations of the floor slab 4d on the basis of the envelope curve of the width-direction acceleration. Since vertical-direction acceleration changes more due to the passing of the vehicle 5 than width-direction acceleration, the vibrations of the floor slab 4d are desirably detected using the envelope curve of vertical-direction acceleration.

Hitherto, the invention has been described using embodiments, but the functional constitution of the measurement instrument has been classified in accordance with the main processing contents in order to facilitate the understanding of the constitution of the measurement instrument. The method or name of the classification of constituent elements is not limited by the invention of the present application. The constitution of the measurement instrument can also be classified into a larger number of constituent elements in accordance with processing contents. In addition, the constitution can also be classified so that a single constituent element executes more processes. In addition, the number of kinds of hardware used to execute the processes of the respective constituent elements may be one or multiple.

In addition, the technical scope of the invention is not limited to the scopes described in the above-described embodiments. It is clear to persons in the art that a variety of changes or improvements can be added to the embodiments. For example, the vibration detection described in the third embodiment may be added to the second embodiment. In addition, it is clear from the scope of the appended claims that aspects obtained by adding the above-described changes or improvements to the embodiments can also be included in the technical scope of the invention. In addition, the invention can also be provided in a form of a measurement method, a program for measurement instruments, or a storage medium in which the program is stored. In addition, a device may be constituted by storing the measurement instrument and the acceleration sensor in a single chassis, and the analysis results of the measurement instrument may be communicated to communication networks from this device.

The entire disclosures of Japanese Patent Application No. 2015-196614, filed Oct. 2, 2015 and No. 2015-196615, filed Oct. 2, 2015 are expressly incorporated by reference herein.

What is claimed is:

1. A movable object information obtaining system comprising:
    an acceleration sensor that is disposed on a side of a bridge deck, the bridge deck extending along a plane having a Y axis and a Z axis perpendicular to each other, a movable object being movable on the bridge deck in a direction along the Y axis, the bridge deck being movable along an X axis perpendicular to the Y and Z axes when the movable object moves on the bridge deck, the acceleration sensor being configured to detect vertical direction acceleration along the X axis and to detect width direction acceleration along the Z axis;
    a memory configured to store computer-readable instructions; and
    a processor configured to execute the computer-readable instructions so as to:
        obtain sensor data corresponding to the vertical direction acceleration and the width direction acceleration from the acceleration sensor;
        filter out a frequency band including a natural resonance frequency component of the bridge deck from the sensor data so as to generate filtered sensor data;
        calculate vertical direction displacement based on the vertical direction acceleration detected by the acceleration sensor;
        determine a correlation between the calculated vertical direction displacement and the width direction acceleration detected by the acceleration sensor;
        detect movement of the movable object on the bridge deck based on the determined correlation; and
        obtain movable object information of the movable object based on the filtered sensor data and the vertical direction displacement,
    wherein the acceleration sensor is configured to detect a Z axis component of gravity acceleration due to inclination of a surface of the bridge deck when the movable object moves on the bridge deck, and the Z axis component of gravity acceleration corresponds to the width direction acceleration, and
    the acceleration sensor is configured to detect the vertical direction acceleration along the X axis due to the inclination of the surface of the bridge deck caused by a weight of the movable object.

2. The movable object information obtaining system according to claim 1,
    wherein the processor is configured to calculate covariance of the calculated vertical direction displacement and the width direction acceleration so as to determine the correlation.

3. The movable object information obtaining system according to claim 1,
    wherein the processor is configured to obtain characteristic information of a waveform of the width direction acceleration when the processor detects the movement of the movable object on the bridge deck, and
    the waveform is approximated based on a wave crest value, a wave amplitude, a waveform coefficient, and a time at which the movable object moves on the bridge deck.

4. The movable object information obtaining system according to claim 2,
    wherein the processor is configured to obtain characteristic information of a waveform of the width direction acceleration when the processor detects the movement of the movable object on the bridge deck, and
    the waveform is approximated based on a wave crest value, a wave amplitude, a waveform coefficient, and a time at which the movable object moves on the bridge deck.

5. The movable object information obtaining system according to claim 1,
    wherein the processor is configured to obtain characteristic information of a waveform of the vertical direction displacement when the processor detects the movement of the movable object on the bridge deck, and
    the waveform is approximated based on a wave crest value "$h_u$," a wave amplitude "$w_u$," a waveform coefficient "$a$," and a time "$t_0$" at which the movable object moves on the bridge deck.

6. The movable object information obtaining system according to claim 5,
    wherein the waveform is approximated by the following expression:

$$u(t) = h_u \cdot a^{-\left(\frac{t-t_0}{w_u}\right)^2}.$$

7. The movable object information obtaining system according to claim 6,
    wherein the waveform is obtained by approximating at a pre-time that is before the time "$t_0$" and at a post-time that is after the time "$t_0$."

8. The movable object information obtaining system according to claim 1,
    wherein the processor is configured to calculate an envelope curve of the the vertical direction acceleration,
    the processor is configured to detect vibration of the bridge deck based on the calculated envelope curve, and
    the processor is configured to determine the correlation when the processor detects the vibration of the bridge deck.

9. The movable object information obtaining system according to claim 2,
    wherein the processor is configured to calculate an envelope curve of the the vertical direction acceleration,
    the processor is configured to detect vibration of the bridge deck based on the calculated envelope curve, and
    the processor is configured to determine the correlation when the processor detects the vibration of the bridge deck.

10. A method of obtaining movable object information for causing a processor to execute computer-readable instructions stored in a memory, the method comprising executing on the processor the steps of:
    detecting vertical direction acceleration along an X axis by an acceleration sensor that is disposed on a side of a bridge deck, the bridge deck extending along a plane having a Y axis and a Z axis perpendicular to each other, a movable object being movable on the bridge deck in a direction along the Y axis, the bridge deck being movable along the X axis perpendicular to the Y and Z axes when the movable object moves on the bridge deck;
    detecting width direction acceleration along the Z axis by the acceleration sensor;
    obtaining sensor data corresponding to the vertical direction acceleration and the width direction acceleration from the acceleration sensor;

filtering out a frequency band including a natural resonance frequency component of the bridge deck from the sensor data so as to generate filtered sensor data;

calculating vertical direction displacement based on the vertical direction acceleration detected by the acceleration sensor;

calculating covariance of the calculated vertical direction displacement and the width direction acceleration;

determining a correlation between the calculated vertical direction displacement and the width direction acceleration based on the covariance;

detecting a movement of the movable object on the bridge deck based on the determined correlation; and obtaining movable object information of the movable object based on the filtered data and the vertical direction displacement, wherein the acceleration sensor is configured to detect a Z axis component of gravity acceleration due to inclination of a surface of the bridge deck when the movable object moves on the bridge deck, and the Z axis component of gravity acceleration corresponds to the width direction acceleration, and the acceleration sensor is configured to detect the vertical direction acceleration along the X axis due to the inclination of the surface of the bridge deck caused by the weight of the movable object.

* * * * *